(12) United States Patent
Laird et al.

(10) Patent No.: US 11,859,690 B2
(45) Date of Patent: Jan. 2, 2024

(54) SUSPENSION SYSTEM

(71) Applicant: Fox Factory, Inc., Duluth, GA (US)

(72) Inventors: Andrew Laird, Los Gatos, CA (US); William M. Becker, Aptos, CA (US)

(73) Assignee: Fox Factory, Inc., Duluth, GA (US)

( * ) Notice: Subject to any disclaimer, the term of this patent is extended or adjusted under 35 U.S.C. 154(b) by 302 days.

(21) Appl. No.: 16/983,294

(22) Filed: Aug. 3, 2020

(65) Prior Publication Data
US 2021/0010556 A1 Jan. 14, 2021

Related U.S. Application Data

(63) Continuation of application No. 16/243,911, filed on Jan. 9, 2019, now Pat. No. 10,731,724, which is a
(Continued)

(51) Int. Cl.
*F16F 9/34* (2006.01)
*B62K 25/08* (2006.01)
(Continued)

(52) U.S. Cl.
CPC .............. *F16F 9/34* (2013.01); *B62K 25/08* (2013.01); *F16F 9/092* (2013.01); *F16F 9/18* (2013.01);
(Continued)

(58) Field of Classification Search
CPC ... B62K 25/08; F16F 9/092; F16F 9/18; F16F 9/34; F16F 9/363; F16F 9/464; F16F 9/504; F16F 13/002; F16F 13/007

USPC ............ 188/275, 314.276, 322.13, 316, 318, 188/319.1–319.2, 266.6, 322.2, 285, 297, 188/315, 322.19, 300; 280/284
See application file for complete search history.

(56) References Cited

U.S. PATENT DOCUMENTS

| 435,995 A | 9/1890 | Dunlop |
| 1,078,060 A | 11/1913 | Newman |

(Continued)

FOREIGN PATENT DOCUMENTS

| DE | 3613386 A1 | 10/1986 |
| DE | 3532292 A1 | 3/1987 |

(Continued)

OTHER PUBLICATIONS

European Search Report for European Application No. 19155995, 11 pages, Aug. 28, 2019.
(Continued)

*Primary Examiner* — Robert A. Siconolfi
*Assistant Examiner* — San M Aung

(57) ABSTRACT

A suspension system includes a first suspension member movable relative to a second suspension member, a fluid reservoir having a volume, the volume variable in response to a relative movement between the first and second suspension members, and a fluid flow circuit having a first end in fluidic communication with the fluid reservoir and a second end in fluidic communication with an isolated suspension location, the fluid flow circuit comprising a first valve, a second valve and a third valve, wherein said first and third valves are in parallel with each other and the second valve is in series with each of the first and third valves.

21 Claims, 20 Drawing Sheets

Related U.S. Application Data continuation of application No. 14/920,175, filed on Oct. 22, 2015, now Pat. No. 10,180,171, which is a continuation of application No. 14/079,014, filed on Nov. 13, 2013, now Pat. No. 9,194,456, which is a continuation of application No. 12/903,022, filed on Oct. 12, 2010, now Pat. No. 8,672,106.

(60) Provisional application No. 61/250,999, filed on Oct. 13, 2009.

(51) Int. Cl.
  *F16F 9/092* (2006.01)
  *F16F 9/36* (2006.01)
  *F16F 9/46* (2006.01)
  *F16F 9/504* (2006.01)
  *F16F 13/00* (2006.01)
  *F16F 9/18* (2006.01)

(52) U.S. Cl.
  CPC .............. *F16F 9/363* (2013.01); *F16F 9/464* (2013.01); *F16F 9/504* (2013.01); *F16F 13/002* (2013.01); *F16F 13/007* (2013.01)

(56) References Cited

U.S. PATENT DOCUMENTS

| | | |
|---|---|---|
| 1,307,502 A | 6/1919 | Martin |
| 1,409,849 A | 3/1922 | Haeberlein |
| 1,468,652 A | 9/1923 | Storey et al. |
| 1,492,731 A | 5/1924 | Kerr |
| 1,560,477 A | 11/1925 | Kessler |
| 1,571,788 A | 2/1926 | Bramlette, Jr. |
| 1,575,973 A | 3/1926 | Coleman |
| 1,655,786 A | 1/1928 | Guerritore et al. |
| 1,923,011 A | 8/1933 | Moulton |
| 1,948,600 A | 2/1934 | Templeton |
| 2,018,312 A | 10/1935 | Moulton |
| 2,115,072 A | 4/1938 | Hunt et al. |
| 2,122,407 A | 7/1938 | Chisholm |
| 2,186,266 A | 1/1940 | Henry |
| 2,259,437 A | 10/1941 | Dean |
| 2,354,340 A | 7/1944 | Utter |
| 2,363,867 A | 11/1944 | Isely |
| 2,492,331 A | 12/1949 | Spring |
| 2,518,553 A | 8/1950 | Kieber |
| 2,540,525 A | 2/1951 | Howarth et al. |
| 2,559,633 A | 7/1951 | Maurice et al. |
| 2,588,520 A | 3/1952 | Halgren et al. |
| 2,697,600 A | 12/1954 | Gregoire |
| 2,705,119 A | 3/1955 | Ingwer |
| 2,725,076 A | 11/1955 | Hansen et al. |
| 2,729,308 A | 1/1956 | Koski et al. |
| 2,784,962 A | 3/1957 | Sherburne |
| 2,809,722 A | 10/1957 | Smith |
| 2,838,140 A | 6/1958 | Rasmusson et al. |
| 2,846,028 A | 8/1958 | Gunther |
| 2,853,974 A | 9/1958 | Hewitt |
| 2,879,971 A | 3/1959 | Demay |
| 2,883,181 A | 4/1959 | Hogan et al. |
| 2,897,613 A | 8/1959 | Davidson et al. |
| 2,924,304 A | 2/1960 | Patriquin |
| 2,941,629 A | 6/1960 | Etienne et al. |
| 2,967,065 A | 1/1961 | Schwendner |
| 2,973,744 A | 3/1961 | Hennells |
| 2,991,804 A | 7/1961 | Merkle |
| 3,003,595 A | 10/1961 | Patriquin et al. |
| 3,056,598 A | 10/1962 | Ransom et al. |
| 3,071,394 A | 1/1963 | John |
| 3,073,586 A | 1/1963 | Hartel et al. |
| 3,074,709 A | 1/1963 | Ellis et al. |
| 3,085,530 A | 4/1963 | Williamson |
| 3,087,583 A | 4/1963 | Bruns |
| 3,107,753 A | 10/1963 | Georgette et al. |
| 3,127,958 A | 4/1964 | Szostak |
| 3,175,645 A | 3/1965 | Schafer et al. |
| 3,202,413 A | 8/1965 | Colmerauer |
| 3,206,153 A | 9/1965 | Burke |
| 3,238,850 A | 3/1966 | Desmarchelier |
| 3,284,076 A | 11/1966 | Gibson |
| 3,286,797 A | 11/1966 | Leibfritz et al. |
| 3,405,625 A | 10/1968 | Carlson et al. |
| 3,419,849 A | 12/1968 | Anderson et al. |
| 3,420,493 A | 1/1969 | Kraft et al. |
| 3,494,606 A | 2/1970 | Hanchen |
| 3,528,700 A | 9/1970 | Janu et al. |
| 3,537,722 A | 11/1970 | Moulton |
| 3,556,137 A | 1/1971 | Billeter et al. |
| 3,559,027 A | 1/1971 | Arsem |
| 3,560,033 A | 2/1971 | Barkus |
| 3,575,442 A | 4/1971 | Elliott et al. |
| 3,584,331 A | 6/1971 | Richard et al. |
| 3,603,575 A | 9/1971 | Arlasky et al. |
| 3,605,960 A | 9/1971 | Singer |
| 3,621,950 A | 11/1971 | Lutz |
| 3,650,033 A | 3/1972 | Behne et al. |
| 3,701,544 A | 10/1972 | Stankovich |
| 3,714,953 A | 2/1973 | Solvang |
| 3,750,856 A | 8/1973 | Kenworthy et al. |
| 3,784,228 A | 1/1974 | Hoffmann et al. |
| 3,791,408 A | 2/1974 | Saitou et al. |
| 3,792,644 A | 2/1974 | Ferguson et al. |
| 3,795,291 A | 3/1974 | Naito et al. |
| 3,830,482 A | 8/1974 | Norris |
| 3,842,753 A | 10/1974 | Ross et al. |
| 3,861,487 A | 1/1975 | Gill |
| 3,903,613 A | 9/1975 | Bisberg |
| 3,941,402 A | 3/1976 | Yankowski et al. |
| 3,981,204 A | 9/1976 | Starbard et al. |
| 3,981,479 A | 9/1976 | Foster et al. |
| 3,986,118 A | 10/1976 | Madigan |
| 4,022,113 A | 5/1977 | Blatt et al. |
| 4,032,829 A | 6/1977 | Schenavar et al. |
| 4,036,335 A | 7/1977 | Thompson et al. |
| 4,045,008 A | 8/1977 | Bauer |
| 4,072,087 A | 2/1978 | Mueller et al. |
| 4,103,881 A | 8/1978 | Simich |
| 4,114,735 A | 9/1978 | Kato |
| 4,121,610 A | 10/1978 | Harms et al. |
| 4,131,657 A | 12/1978 | Ball et al. |
| 4,139,186 A | 2/1979 | Postema et al. |
| 4,153,237 A | 5/1979 | Supalla |
| 4,159,106 A | 6/1979 | Nyman et al. |
| 4,166,612 A | 9/1979 | Freitag et al. |
| 4,174,098 A | 11/1979 | Baker et al. |
| 4,183,509 A | 1/1980 | Nishikawa et al. |
| 4,287,812 A | 9/1981 | Izumi |
| 4,291,850 A | 9/1981 | Sharples |
| 4,305,566 A | 12/1981 | Grawunde |
| 4,311,302 A | 1/1982 | Heyer et al. |
| 4,333,668 A | 6/1982 | Hendrickson et al. |
| 4,334,711 A | 6/1982 | Mazur et al. |
| 4,337,850 A | 7/1982 | Shimokura et al. |
| 4,348,016 A | 9/1982 | Milly |
| 4,351,515 A | 9/1982 | Yoshida |
| 4,366,969 A | 1/1983 | Benya et al. |
| 4,387,781 A | 6/1983 | Ezell et al. |
| 4,437,548 A | 3/1984 | Ashiba et al. |
| 4,465,299 A | 8/1984 | Stone et al. |
| 4,474,363 A | 10/1984 | Numazawa et al. |
| 4,491,207 A | 1/1985 | Boonchanta et al. |
| 4,500,827 A | 2/1985 | Merritt et al. |
| 4,502,673 A | 3/1985 | Clark et al. |
| 4,529,180 A | 7/1985 | Hill |
| 4,546,959 A | 10/1985 | Tanno |
| 4,548,233 A | 10/1985 | Wolfges |
| 4,550,899 A | 11/1985 | Holley |
| 4,570,851 A | 2/1986 | Cirillo et al. |
| 4,572,317 A | 2/1986 | Isono et al. |
| 4,620,619 A | 11/1986 | Emura et al. |
| 4,624,346 A | 11/1986 | Katz et al. |
| 4,630,818 A | 12/1986 | Saarinen |
| 4,634,142 A | 1/1987 | Woods et al. |

(56) References Cited

U.S. PATENT DOCUMENTS

| | | |
|---|---|---|
| 4,647,068 A | 3/1987 | Asami et al. |
| 4,655,440 A | 4/1987 | Eckert |
| 4,657,280 A | 4/1987 | Phmori et al. |
| 4,659,104 A | 4/1987 | Tanaka et al. |
| 4,660,689 A | 4/1987 | Hayashi et al. |
| 4,662,616 A | 5/1987 | Hennells |
| 4,673,194 A | 6/1987 | Sugasawa |
| 4,709,779 A | 12/1987 | Takehara |
| 4,729,459 A | 3/1988 | Inagaki et al. |
| 4,732,244 A | 3/1988 | Verkuylen |
| 4,743,000 A | 5/1988 | Karnopp |
| 4,744,444 A | 5/1988 | Gillingham |
| 4,750,735 A | 6/1988 | Furgerson et al. |
| 4,765,648 A | 8/1988 | Mander et al. |
| 4,773,671 A | 9/1988 | Nagaki |
| 4,786,034 A | 11/1988 | Heess et al. |
| 4,815,575 A | 3/1989 | Murty et al. |
| 4,821,852 A | 4/1989 | Yokoya |
| 4,826,207 A | 5/1989 | Yoshioka et al. |
| 4,830,395 A | 5/1989 | Foley |
| 4,836,578 A | 6/1989 | Soltis |
| 4,838,306 A | 6/1989 | Horn et al. |
| 4,838,394 A | 6/1989 | Emme et al. |
| 4,838,527 A | 6/1989 | Holley |
| 4,846,317 A | 7/1989 | Hudgens |
| 4,858,733 A | 8/1989 | Noguchi et al. |
| 4,919,166 A | 4/1990 | Sims et al. |
| 4,936,423 A | 6/1990 | Karnopp |
| 4,936,424 A | 6/1990 | Costa |
| 4,938,228 A | 7/1990 | Righter |
| 4,949,262 A | 8/1990 | Buma et al. |
| 4,949,989 A | 8/1990 | Kakizaki et al. |
| 4,958,706 A | 9/1990 | Richardson et al. |
| 4,972,928 A | 11/1990 | Sirven |
| 4,975,849 A | 12/1990 | Ema et al. |
| 4,984,819 A | 1/1991 | Kakizaki et al. |
| 4,986,393 A | 1/1991 | Preukschat et al. |
| 5,027,303 A | 6/1991 | Witte |
| 5,031,455 A | 7/1991 | Cline |
| 5,036,934 A | 8/1991 | Nishina et al. |
| 5,040,381 A | 8/1991 | Hazen |
| 5,044,614 A | 9/1991 | Rau |
| 5,060,959 A | 10/1991 | Davis et al. |
| 5,072,812 A | 12/1991 | Imaizumi |
| 5,074,624 A | 12/1991 | Stauble et al. |
| 5,076,404 A | 12/1991 | Gustafsson |
| 5,080,392 A | 1/1992 | Bazergui |
| 5,094,325 A | 3/1992 | Smith |
| 5,105,918 A | 4/1992 | Hagiwara et al. |
| 5,113,980 A | 5/1992 | Furrer et al. |
| 5,127,634 A | 7/1992 | Le Gourvellec |
| 5,152,547 A | 10/1992 | Davis |
| 5,161,653 A | 11/1992 | Hare |
| 5,161,817 A | 11/1992 | Daum et al. |
| 5,163,742 A | 11/1992 | Topfer et al. |
| 5,178,242 A | 1/1993 | Nakamura et al. |
| 5,186,481 A | 2/1993 | Turner |
| 5,203,584 A | 4/1993 | Butsuen et al. |
| 5,207,774 A | 5/1993 | Wolfe et al. |
| 5,230,364 A | 7/1993 | Eng et al. |
| 5,236,169 A | 8/1993 | Johnsen et al. |
| 5,248,014 A | 9/1993 | Ashiba |
| 5,259,487 A | 11/1993 | Petek et al. |
| 5,263,559 A | 11/1993 | Mettner |
| 5,265,902 A | 11/1993 | Lewis |
| 5,277,283 A | 1/1994 | Yamaoka et al. |
| 5,283,733 A | 2/1994 | Colley |
| 5,284,330 A | 2/1994 | Carlson et al. |
| 5,293,971 A | 3/1994 | Kanari |
| 5,295,563 A | 3/1994 | Bennett |
| 5,307,907 A | 5/1994 | Nakamura et al. |
| 5,310,203 A * | 5/1994 | Chen .................... B62K 25/08 267/141.1 |
| 5,318,066 A | 6/1994 | Burgorf et al. |
| 5,328,004 A | 7/1994 | Fannin et al. |
| 5,347,186 A | 9/1994 | Konotchick et al. |
| 5,348,112 A | 9/1994 | Vaillancourt |
| 5,372,223 A | 12/1994 | Dekock et al. |
| 5,372,224 A | 12/1994 | Samonil et al. |
| 5,381,952 A | 1/1995 | Duprez |
| 5,390,949 A | 2/1995 | Naganathan et al. |
| 5,392,885 A | 2/1995 | Patzenhauer et al. |
| 5,396,973 A | 3/1995 | Schwemmer et al. |
| 5,398,787 A | 3/1995 | Woessner et al. |
| 5,413,196 A | 5/1995 | Forster |
| 5,445,366 A * | 8/1995 | Shih .................... B62K 25/08 267/140.13 |
| 5,467,280 A | 11/1995 | Kimura |
| 5,480,011 A | 1/1996 | Nagai et al. |
| 5,487,006 A | 1/1996 | Kakizaki et al. |
| 5,503,258 A | 4/1996 | Clarke et al. |
| 5,517,898 A | 5/1996 | Kim et al. |
| 5,542,150 A | 8/1996 | Tu |
| 5,551,674 A | 9/1996 | Johnsen |
| 5,553,836 A | 9/1996 | Ericson |
| 5,566,794 A | 10/1996 | Wiard |
| 5,578,877 A | 11/1996 | Tiemann |
| 5,588,510 A | 12/1996 | Wilke |
| 5,592,401 A | 1/1997 | Kramer |
| 5,597,180 A | 1/1997 | Ganzel et al. |
| 5,598,337 A | 1/1997 | Butsuen et al. |
| 5,601,164 A | 2/1997 | Ohsaki et al. |
| 5,611,413 A | 3/1997 | Feigel |
| 5,634,563 A | 6/1997 | Peng |
| 5,651,433 A | 7/1997 | Wirth et al. |
| 5,657,840 A | 8/1997 | Lizell |
| 5,687,575 A | 11/1997 | Keville et al. |
| 5,697,477 A | 12/1997 | Hiramoto et al. |
| 5,699,885 A | 12/1997 | Forster |
| 5,722,645 A | 3/1998 | Reitter |
| 5,803,443 A | 9/1998 | Chang |
| 5,806,159 A | 9/1998 | Ohnishi et al. |
| 5,810,128 A | 9/1998 | Eriksson et al. |
| 5,813,456 A | 9/1998 | Milner et al. |
| 5,813,731 A | 9/1998 | Newman et al. |
| 5,816,281 A | 10/1998 | Mixon |
| 5,818,132 A | 10/1998 | Konotchick et al. |
| 5,826,935 A | 10/1998 | DeFreitas et al. |
| 5,828,843 A | 10/1998 | Samuel et al. |
| 5,829,733 A | 11/1998 | Becker |
| 5,833,036 A | 11/1998 | Gillespie |
| 5,850,352 A | 12/1998 | Moezzi et al. |
| 5,853,071 A | 12/1998 | Robinson |
| 5,872,418 A | 2/1999 | Wischnewskiy |
| 5,884,921 A | 3/1999 | Katsuda et al. |
| 5,937,975 A | 8/1999 | Forster |
| 5,947,238 A | 9/1999 | Jolly et al. |
| 5,952,823 A | 9/1999 | Sprecher et al. |
| 5,954,318 A | 9/1999 | Kluhsman |
| 5,956,951 A | 9/1999 | O'Callaghan |
| 5,957,252 A | 9/1999 | Berthold |
| 5,971,116 A | 10/1999 | Franklin |
| 5,988,330 A | 11/1999 | Morris |
| 5,988,655 A | 11/1999 | Sakai et al. |
| 5,992,450 A | 11/1999 | Parker et al. |
| 5,996,745 A | 12/1999 | Jones et al. |
| 5,996,746 A | 12/1999 | Turner et al. |
| 5,999,868 A | 12/1999 | Beno et al. |
| 6,000,702 A | 12/1999 | Streiter |
| 6,013,007 A | 1/2000 | Root et al. |
| 6,017,047 A | 1/2000 | Hoose |
| 6,029,958 A | 2/2000 | Larsson et al. |
| 6,035,979 A | 3/2000 | Forster |
| 6,050,583 A | 4/2000 | Bohn |
| 6,058,340 A | 5/2000 | Uchiyama et al. |
| 6,067,490 A | 5/2000 | Ichimaru et al. |
| 6,073,536 A | 6/2000 | Campbell |
| 6,073,700 A | 6/2000 | Tsuji et al. |
| 6,073,736 A | 6/2000 | Franklin |
| 6,092,011 A | 7/2000 | Hiramoto et al. |
| 6,092,816 A | 7/2000 | Sekine et al. |
| 6,105,988 A | 8/2000 | Turner et al. |
| 6,112,868 A | 9/2000 | Graham et al. |
| 6,120,049 A | 9/2000 | Gonzalez et al. |

(56) References Cited

U.S. PATENT DOCUMENTS

| | | |
|---|---|---|
| 6,131,709 A | 10/2000 | Jolly et al. |
| 6,135,434 A | 10/2000 | Marking |
| 6,141,969 A | 11/2000 | Launchbury et al. |
| 6,151,930 A | 11/2000 | Carlson |
| 6,152,856 A | 11/2000 | Studor et al. |
| 6,179,098 B1 | 1/2001 | Hayakawa et al. |
| 6,196,555 B1 | 3/2001 | Gaibler |
| 6,199,669 B1 | 3/2001 | Huang et al. |
| 6,203,026 B1 | 3/2001 | Jones |
| 6,213,263 B1 | 4/2001 | De Frenne |
| 6,215,217 B1 | 4/2001 | Kurosawa et al. |
| 6,217,049 B1* | 4/2001 | Becker ............... B62K 25/08 188/313 |
| 6,219,045 B1 | 4/2001 | Leahy et al. |
| 6,244,398 B1 | 6/2001 | Girvin et al. |
| 6,254,067 B1 | 7/2001 | Yih |
| 6,279,702 B1 | 8/2001 | Koh |
| 6,293,530 B1 | 9/2001 | Delorenzis et al. |
| 6,296,092 B1 | 10/2001 | Marking et al. |
| 6,311,962 B1 | 11/2001 | Marking |
| 6,318,525 B1* | 11/2001 | Vignocchi ........ B60G 17/0272 188/266.6 |
| 6,321,888 B1 | 11/2001 | Reybrouck et al. |
| 6,322,468 B1 | 11/2001 | Wing et al. |
| 6,336,648 B1 | 1/2002 | Bohn |
| 6,343,807 B1 | 2/2002 | Rathbun |
| 6,359,837 B1 | 3/2002 | Tsukamoto et al. |
| 6,360,857 B1 | 3/2002 | Fox et al. |
| 6,371,262 B1 | 4/2002 | Katou et al. |
| 6,371,267 B1 | 4/2002 | Kao et al. |
| 6,378,816 B1 | 4/2002 | Pfister |
| 6,378,885 B1 | 4/2002 | Ellsworth et al. |
| 6,382,370 B1* | 5/2002 | Girvin ................... F16F 9/06 188/313 |
| 6,389,341 B1 | 5/2002 | Davis |
| 6,390,747 B1 | 5/2002 | Commins |
| 6,394,238 B1 | 5/2002 | Rogala |
| 6,401,883 B1 | 6/2002 | Nyce et al. |
| 6,412,788 B1 | 7/2002 | Ichimaru |
| 6,415,895 B2 | 7/2002 | Marking et al. |
| 6,418,360 B1 | 7/2002 | Spivey et al. |
| 6,427,812 B2 | 8/2002 | Crawley et al. |
| 6,434,460 B1 | 8/2002 | Uchino et al. |
| 6,446,771 B1 | 9/2002 | Sintorn et al. |
| 6,458,060 B1 | 10/2002 | Watterson et al. |
| 6,467,593 B1 | 10/2002 | Corradini et al. |
| 6,474,454 B2 | 11/2002 | Matsumoto et al. |
| 6,474,753 B1 | 11/2002 | Rieth et al. |
| 6,501,554 B1 | 12/2002 | Hackney et al. |
| 6,502,837 B1 | 1/2003 | Hamilton et al. |
| 6,510,929 B1 | 1/2003 | Gordaninejad et al. |
| 6,520,297 B1 | 2/2003 | Lumpkin et al. |
| 6,527,093 B2 | 3/2003 | Oliver et al. |
| 6,592,136 B2* | 7/2003 | Becker ................... F16F 9/44 188/282.1 |
| 6,604,751 B2 | 8/2003 | Fox |
| 6,609,686 B2 | 8/2003 | Malizia |
| 6,619,615 B1 | 9/2003 | Mayr et al. |
| 6,623,389 B1 | 9/2003 | Campagnolo |
| 6,648,109 B2 | 11/2003 | Farr et al. |
| 6,659,240 B2 | 12/2003 | Dernebo |
| 6,659,241 B2 | 12/2003 | Sendrea |
| 6,672,687 B2 | 1/2004 | Nishio |
| 6,701,234 B1 | 3/2004 | Vogelsang et al. |
| 6,722,678 B2 | 4/2004 | McAndrews |
| 6,732,033 B2 | 5/2004 | Laplante et al. |
| 6,755,113 B2 | 6/2004 | Shih |
| 6,782,980 B2 | 8/2004 | Nakadate |
| 6,817,454 B2 | 11/2004 | Nezu et al. |
| 6,837,827 B1 | 1/2005 | Lee et al. |
| 6,840,257 B2 | 1/2005 | Dario et al. |
| 6,853,955 B1 | 2/2005 | Burrell et al. |
| 6,857,625 B2 | 2/2005 | Löser et al. |
| 6,863,291 B2 | 3/2005 | Miyoshi |
| 6,902,513 B1 | 6/2005 | McClure et al. |
| 6,905,203 B2 | 6/2005 | Kremers et al. |
| 6,920,951 B2 | 7/2005 | Song et al. |
| 6,921,351 B1 | 7/2005 | Hickman et al. |
| 6,923,853 B2 | 8/2005 | Kremers et al. |
| 6,935,157 B2 | 8/2005 | Miller |
| 6,952,060 B2 | 10/2005 | Goldner et al. |
| 6,959,906 B2 | 11/2005 | Hoenig et al. |
| 6,959,921 B2 | 11/2005 | Rose |
| 6,966,412 B2 | 11/2005 | Braswell et al. |
| 6,978,871 B2 | 12/2005 | Holiviers |
| 6,978,872 B2 | 12/2005 | Turner |
| 6,991,076 B2 | 1/2006 | McAndrews |
| 7,025,367 B2 | 4/2006 | McKinnon et al. |
| 7,076,351 B2 | 7/2006 | Hamilton et al. |
| 7,128,192 B2 | 10/2006 | Fox |
| 7,128,693 B2 | 10/2006 | Brown et al. |
| 7,135,794 B2 | 11/2006 | Kühnel |
| 7,147,207 B2 | 12/2006 | Jordan et al. |
| 7,163,222 B2 | 1/2007 | Becker et al. |
| 7,166,062 B1 | 1/2007 | Watterson et al. |
| 7,166,064 B2 | 1/2007 | Ashby et al. |
| 7,204,466 B2 | 4/2007 | Hsieh |
| 7,208,845 B2 | 4/2007 | Schaefer et al. |
| 7,217,224 B2 | 5/2007 | Thomas |
| 7,234,575 B2 | 6/2007 | Anderfaas et al. |
| 7,234,680 B2 | 6/2007 | Hull et al. |
| 7,243,763 B2 | 7/2007 | Carlson |
| 7,255,210 B2 | 8/2007 | Larsson et al. |
| 7,270,221 B2 | 9/2007 | McAndrews |
| 7,270,222 B1 | 9/2007 | Aymar et al. |
| 7,287,760 B1 | 10/2007 | Quick et al. |
| 7,289,138 B2 | 10/2007 | Foote et al. |
| 7,292,867 B2 | 11/2007 | Werner et al. |
| 7,293,764 B2 | 11/2007 | Fang |
| 7,299,112 B2 | 11/2007 | LaPlante et al. |
| 7,306,206 B2 | 12/2007 | Turner |
| 7,316,406 B2 | 1/2008 | Kimura et al. |
| 7,325,660 B2 | 2/2008 | Norgaard et al. |
| 7,363,129 B1 | 4/2008 | Barnicle et al. |
| 7,374,028 B2 | 5/2008 | Fox |
| 7,397,355 B2 | 7/2008 | Tracy |
| 7,413,062 B2 | 8/2008 | Vandewal |
| 7,413,063 B1 | 8/2008 | Davis |
| 7,415,336 B1 | 8/2008 | Burch et al. |
| 7,422,092 B2 | 9/2008 | Hitchcock et al. |
| 7,441,638 B2 | 10/2008 | Hanawa |
| 7,469,910 B2 | 12/2008 | Münster et al. |
| 7,484,603 B2 | 2/2009 | Fox |
| 7,490,705 B2 | 2/2009 | Fox |
| 7,513,490 B2 | 4/2009 | Robertson |
| 7,523,617 B2 | 4/2009 | Colpitts et al. |
| 7,558,313 B2 | 7/2009 | Feher |
| 7,558,574 B2 | 7/2009 | Feher et al. |
| 7,566,290 B2 | 7/2009 | Lee et al. |
| 7,569,952 B1 | 8/2009 | Bono et al. |
| 7,581,743 B2 | 9/2009 | Graney et al. |
| 7,591,352 B2 | 9/2009 | Hanawa |
| 7,600,616 B2 | 10/2009 | Anderfaas et al. |
| 7,628,259 B2 | 12/2009 | Norgaard et al. |
| 7,631,882 B2 | 12/2009 | Hirao et al. |
| 7,654,369 B2 | 2/2010 | Murray et al. |
| 7,673,936 B2 | 3/2010 | Isu et al. |
| 7,684,911 B2 | 3/2010 | Seifert et al. |
| 7,694,785 B2 | 4/2010 | Nakadate |
| 7,694,987 B2 | 4/2010 | McAndrews |
| 7,699,753 B2 | 4/2010 | Daikeler et al. |
| 7,703,585 B2 | 4/2010 | Fox |
| 7,722,056 B2 | 5/2010 | Inoue et al. |
| 7,722,069 B2 | 5/2010 | Shirai |
| 7,726,042 B2 | 6/2010 | Meschan |
| 7,730,906 B2 | 6/2010 | Kleinert et al. |
| 7,736,272 B2 | 6/2010 | Martens |
| 7,764,990 B2 | 7/2010 | Martikka et al. |
| 7,766,794 B2 | 8/2010 | Oliver et al. |
| 7,770,701 B1 | 8/2010 | Davis |
| 7,775,128 B2 | 8/2010 | Roessingh et al. |
| 7,779,974 B2 | 8/2010 | Timoney et al. |
| 7,795,711 B2 | 9/2010 | Sauciuc et al. |
| 7,837,213 B2 | 11/2010 | Colegrove et al. |

(56) References Cited

U.S. PATENT DOCUMENTS

| | | |
|---|---|---|
| 7,840,346 B2 | 11/2010 | Huhtala et al. |
| 7,841,258 B2 | 11/2010 | Komatsu et al. |
| 7,845,602 B1 | 12/2010 | Young et al. |
| 7,857,325 B2 | 12/2010 | Copsey et al. |
| 7,872,764 B2 | 1/2011 | Higgins-Luthman et al. |
| 7,874,567 B2 | 1/2011 | Ichida et al. |
| 7,901,292 B1 | 3/2011 | Uhlir et al. |
| 7,909,348 B2 | 3/2011 | Klieber et al. |
| 7,927,253 B2 | 4/2011 | Dibenedetto et al. |
| 7,931,132 B2 | 4/2011 | Braun |
| 7,931,563 B2 | 4/2011 | Shaw et al. |
| 7,946,163 B2 | 5/2011 | Gartner |
| 7,975,814 B2 | 7/2011 | Soederdahl |
| 8,016,349 B2 | 9/2011 | Mouri et al. |
| 8,021,270 B2 | 9/2011 | D'Eredita |
| 8,042,427 B2 | 10/2011 | Kawakami et al. |
| 8,056,392 B2 | 11/2011 | Ryan et al. |
| 8,069,964 B2 | 12/2011 | Deferme et al. |
| 8,087,676 B2 | 1/2012 | McIntyre |
| 8,091,910 B2 | 1/2012 | Hara et al. |
| 8,104,591 B2 | 1/2012 | Barefoot et al. |
| 8,121,757 B2 | 2/2012 | Extance et al. |
| 8,121,785 B2 | 2/2012 | Swisher et al. |
| 8,127,900 B2 | 3/2012 | Inoue |
| 8,136,877 B2 | 3/2012 | Walsh et al. |
| 8,141,438 B2 | 3/2012 | Roessingh et al. |
| 8,151,952 B2 | 4/2012 | Lenz et al. |
| 8,191,964 B2 | 6/2012 | Hsu et al. |
| 8,201,476 B2 | 6/2012 | Tsumiyama |
| 8,210,106 B2 | 7/2012 | Tai et al. |
| 8,210,330 B2 | 7/2012 | Vandewal |
| 8,246,065 B1 | 8/2012 | Kodama et al. |
| 8,256,587 B2 | 9/2012 | Bakke et al. |
| 8,256,732 B1 | 9/2012 | Young et al. |
| 8,262,058 B2 | 9/2012 | Kot |
| 8,262,062 B2 | 9/2012 | Kamo et al. |
| 8,262,100 B2 | 9/2012 | Thomas |
| 8,285,447 B2 | 10/2012 | Bennett et al. |
| 8,286,982 B2 | 10/2012 | Plantet et al. |
| 8,291,889 B2 | 10/2012 | Shafer et al. |
| 8,292,274 B2 | 10/2012 | Adoline et al. |
| 8,307,965 B2 | 11/2012 | Föster et al. |
| 8,308,124 B2 | 11/2012 | Hsu |
| 8,317,261 B2 | 11/2012 | Walsh et al. |
| 8,328,454 B2 | 12/2012 | McAndrews et al. |
| 8,336,683 B2 | 12/2012 | McAndrews et al. |
| 8,364,389 B2 | 1/2013 | Dorogusker et al. |
| 8,393,446 B2 | 3/2013 | Haugen |
| 8,413,773 B2 | 4/2013 | Anderfaas et al. |
| 8,423,244 B2 | 4/2013 | Proemm et al. |
| 8,430,770 B2 | 4/2013 | Dugan et al. |
| 8,458,080 B2 | 6/2013 | Shirai |
| 8,480,064 B2 | 7/2013 | Talavasek |
| 8,550,223 B2 | 10/2013 | Cox et al. |
| 8,550,551 B2 | 10/2013 | Shirai |
| 8,556,048 B2 | 10/2013 | Maeda et al. |
| 8,556,049 B2 | 10/2013 | Jee |
| 8,596,663 B2 | 12/2013 | Shirai et al. |
| 8,622,180 B2 | 1/2014 | Wootten et al. |
| 8,627,932 B2 | 1/2014 | Marking |
| 8,641,073 B2 | 2/2014 | Lee et al. |
| 8,651,251 B2 | 2/2014 | Preukschat et al. |
| 8,655,548 B2 | 2/2014 | Ichida et al. |
| 8,727,947 B2 | 5/2014 | Tagliabue |
| 8,744,699 B2 | 6/2014 | Yamaguchi et al. |
| 8,752,682 B2 | 6/2014 | Park et al. |
| 8,763,770 B2 | 7/2014 | Marking |
| 8,770,357 B2 | 7/2014 | Sims et al. |
| 8,781,680 B2 | 7/2014 | Ichida et al. |
| 8,781,690 B2 | 7/2014 | Hara et al. |
| 8,814,109 B2 | 8/2014 | Calendrille et al. |
| 8,833,786 B2 | 9/2014 | Camp et al. |
| 8,838,335 B2 | 9/2014 | Bass et al. |
| 8,845,496 B2 | 9/2014 | Arrasvuori et al. |
| 8,857,580 B2 | 10/2014 | Marking |
| 8,868,253 B2 | 10/2014 | Hashimoto et al. |
| 8,888,115 B2 | 11/2014 | Chubbuck et al. |
| 8,935,036 B1 | 1/2015 | Christensen et al. |
| 8,936,139 B2 | 1/2015 | Galasso et al. |
| 8,950,771 B2 | 2/2015 | Felsl et al. |
| 8,955,653 B2 | 2/2015 | Marking |
| 8,967,343 B2 | 3/2015 | Battlogg et al. |
| 8,991,571 B2 | 3/2015 | Murakami |
| 9,033,122 B2 | 5/2015 | Ericksen et al. |
| 9,038,791 B2 | 5/2015 | Marking |
| 9,047,778 B1 | 6/2015 | Cazanas et al. |
| 9,057,416 B2 | 6/2015 | Talavasek |
| 9,073,592 B2 | 7/2015 | Hsu |
| 9,103,400 B2 | 8/2015 | Becker |
| 9,108,098 B2 | 8/2015 | Galasso et al. |
| 9,120,362 B2 | 9/2015 | Marking |
| 9,126,647 B2 | 9/2015 | Kuo |
| 9,140,325 B2 | 9/2015 | Cox et al. |
| 9,157,523 B2 | 10/2015 | Miki et al. |
| 9,186,949 B2 | 11/2015 | Galasso et al. |
| 9,194,456 B2 | 11/2015 | Laird et al. |
| 9,199,690 B2 | 12/2015 | Watarai |
| 9,229,712 B2 | 1/2016 | Takamoto et al. |
| 9,239,090 B2 | 1/2016 | Marking et al. |
| 9,278,598 B2 | 3/2016 | Galasso et al. |
| 9,303,712 B2 | 4/2016 | Cox |
| 9,353,818 B2 | 5/2016 | Marking |
| 9,366,307 B2 | 6/2016 | Marking |
| 9,422,018 B2 | 8/2016 | Pelot et al. |
| 9,422,025 B2 | 8/2016 | Pezzi et al. |
| 9,452,654 B2 | 9/2016 | Ericksen et al. |
| 9,523,406 B2 | 12/2016 | Galasso et al. |
| 9,528,565 B2 | 12/2016 | Marking |
| 9,550,405 B2 | 1/2017 | Marking et al. |
| 9,556,925 B2 | 1/2017 | Marking |
| 9,616,728 B2 | 4/2017 | Marking |
| 9,650,094 B2 | 5/2017 | Laird et al. |
| 9,663,181 B2 | 5/2017 | Ericksen et al. |
| 9,682,604 B2 | 6/2017 | Cox et al. |
| 9,784,333 B2 | 10/2017 | Marking |
| 9,975,598 B2 | 5/2018 | Bender et al. |
| 10,036,443 B2 | 7/2018 | Galasso et al. |
| 10,040,328 B2 | 8/2018 | Marking |
| 10,040,329 B2 | 8/2018 | Ericksen et al. |
| 10,054,185 B2 | 8/2018 | Cox |
| 10,072,724 B2 | 9/2018 | Haugen et al. |
| 10,086,670 B2 | 10/2018 | Galasso et al. |
| 10,089,868 B1 | 10/2018 | Hayward |
| 10,094,443 B2 | 10/2018 | Marking |
| 10,145,435 B2 | 12/2018 | Galasso et al. |
| 10,180,171 B2 | 1/2019 | Laird et al. |
| 10,330,171 B2 | 6/2019 | Cox et al. |
| 10,336,148 B2 | 7/2019 | Ericksen et al. |
| 10,336,149 B2 | 7/2019 | Ericksen et al. |
| 10,443,671 B2 | 10/2019 | Marking |
| 10,718,397 B2 | 7/2020 | Marking |
| 2001/0017334 A1 | 8/2001 | Vincent |
| 2001/0022621 A1 | 9/2001 | Squibbs |
| 2001/0030408 A1 | 10/2001 | Miyoshi et al. |
| 2001/0042663 A1 | 11/2001 | Marking et al. |
| 2001/0055373 A1 | 12/2001 | Yamashita |
| 2002/0000352 A1 | 1/2002 | Matsumoto et al. |
| 2002/0032508 A1 | 3/2002 | Uchino et al. |
| 2002/0045987 A1 | 4/2002 | Ohata et al. |
| 2002/0050112 A1 | 5/2002 | Koch et al. |
| 2002/0050518 A1 | 5/2002 | Roustaei |
| 2002/0053493 A1 | 5/2002 | Sintorn et al. |
| 2002/0055422 A1 | 5/2002 | Airmet et al. |
| 2002/0063469 A1 | 5/2002 | Nishio |
| 2002/0089107 A1 | 7/2002 | Koh |
| 2002/0113347 A1 | 8/2002 | Robbins et al. |
| 2002/0121416 A1* | 9/2002 | Katayama ............... F16F 9/096 188/315 |
| 2002/0130000 A1 | 9/2002 | Lisenker et al. |
| 2002/0130003 A1 | 9/2002 | Lisenker et al. |
| 2002/0185581 A1 | 12/2002 | Trask et al. |
| 2002/0187867 A1 | 12/2002 | Ichida et al. |
| 2003/0001346 A1 | 1/2003 | Hamilton et al. |

(56) References Cited

U.S. PATENT DOCUMENTS

| | | |
|---|---|---|
| 2003/0001358 A1* | 1/2003 | Becker .................. B60G 17/08 188/282.1 |
| 2003/0034697 A1 | 2/2003 | Goldner et al. |
| 2003/0040348 A1 | 2/2003 | Martens et al. |
| 2003/0051954 A1 | 3/2003 | Sendrea |
| 2003/0054327 A1 | 3/2003 | Evensen et al. |
| 2003/0065430 A1 | 4/2003 | Lu et al. |
| 2003/0075403 A1 | 4/2003 | Dernebo |
| 2003/0103651 A1 | 6/2003 | Novak |
| 2003/0128275 A1 | 7/2003 | Maguire |
| 2003/0160369 A1 | 8/2003 | LaPlante et al. |
| 2003/0191567 A1 | 10/2003 | Gentilcore |
| 2003/0216845 A1 | 11/2003 | Williston |
| 2004/0004659 A1 | 1/2004 | Foote et al. |
| 2004/0017455 A1 | 1/2004 | Kremers et al. |
| 2004/0021754 A1 | 2/2004 | Kremers et al. |
| 2004/0075350 A1 | 4/2004 | Kuhnel |
| 2004/0091111 A1 | 5/2004 | Levy et al. |
| 2004/0099312 A1 | 5/2004 | Boyer et al. |
| 2004/0103146 A1 | 5/2004 | Park |
| 2004/0172178 A1 | 9/2004 | Takeda et al. |
| 2004/0208687 A1 | 10/2004 | Sicz et al. |
| 2004/0220708 A1 | 11/2004 | Owen et al. |
| 2004/0220712 A1 | 11/2004 | Takeda et al. |
| 2004/0222056 A1 | 11/2004 | Fox |
| 2004/0256778 A1 | 12/2004 | Verriet |
| 2005/0055156 A1 | 3/2005 | Maltagliati et al. |
| 2005/0056507 A1 | 3/2005 | Molina et al. |
| 2005/0077131 A1 | 4/2005 | Russell |
| 2005/0098401 A1 | 5/2005 | Hamilton et al. |
| 2005/0107216 A1 | 5/2005 | Lee et al. |
| 2005/0110229 A1 | 5/2005 | Kimura et al. |
| 2005/0121269 A1 | 6/2005 | Namuduri |
| 2005/0173849 A1 | 8/2005 | Vandewal |
| 2005/0195094 A1 | 9/2005 | White |
| 2005/0199455 A1 | 9/2005 | Browne et al. |
| 2005/0216186 A1 | 9/2005 | Dorfman et al. |
| 2005/0227798 A1 | 10/2005 | Ichida et al. |
| 2005/0239601 A1 | 10/2005 | Thomas |
| 2005/0288154 A1 | 12/2005 | Lee et al. |
| 2006/0040793 A1 | 2/2006 | Martens et al. |
| 2006/0064223 A1 | 3/2006 | Voss |
| 2006/0065496 A1 | 3/2006 | Fox |
| 2006/0066074 A1 | 3/2006 | Turner et al. |
| 2006/0076757 A1 | 4/2006 | Bromley |
| 2006/0081431 A1 | 4/2006 | Breese et al. |
| 2006/0096817 A1 | 5/2006 | Norgaard et al. |
| 2006/0113834 A1 | 6/2006 | Ianawa |
| 2006/0124414 A1 | 6/2006 | Hanawa |
| 2006/0136173 A1 | 6/2006 | Case et al. |
| 2006/0137934 A1 | 6/2006 | Kurth |
| 2006/0137947 A1* | 6/2006 | Fujita .................. B62K 25/08 188/315 |
| 2006/0163551 A1 | 7/2006 | Coenen et al. |
| 2006/0163787 A1 | 7/2006 | Munster et al. |
| 2006/0175792 A1 | 8/2006 | Sicz et al. |
| 2006/0176216 A1 | 8/2006 | Hipskind |
| 2006/0185951 A1 | 8/2006 | Tanaka |
| 2006/0213082 A1 | 9/2006 | Meschan |
| 2006/0219503 A1 | 10/2006 | Kim |
| 2006/0225976 A1 | 10/2006 | Nakadate |
| 2006/0237272 A1* | 10/2006 | Huang .................. B62K 25/04 188/300 |
| 2006/0253210 A1 | 11/2006 | Rosenberg |
| 2006/0289258 A1 | 12/2006 | Fox |
| 2007/0006489 A1 | 1/2007 | Case et al. |
| 2007/0007743 A1 | 1/2007 | Becker et al. |
| 2007/0008096 A1 | 1/2007 | Tracy |
| 2007/0021885 A1 | 1/2007 | Soehren |
| 2007/0032981 A1 | 2/2007 | Merkel et al. |
| 2007/0034464 A1 | 2/2007 | Barefoot |
| 2007/0039790 A1 | 2/2007 | Timoney et al. |
| 2007/0051573 A1 | 3/2007 | Norgaard et al. |
| 2007/0070069 A1 | 3/2007 | Samarasekera et al. |
| 2007/0080515 A1 | 4/2007 | McAndrews et al. |
| 2007/0088475 A1 | 4/2007 | Nordgren et al. |
| 2007/0090518 A1 | 4/2007 | Sauciuc et al. |
| 2007/0119669 A1 | 5/2007 | Anderfaas et al. |
| 2007/0170688 A1 | 7/2007 | Watson |
| 2007/0199401 A1 | 8/2007 | Kawakami et al. |
| 2007/0213126 A1 | 9/2007 | Deutsch et al. |
| 2007/0239479 A1 | 10/2007 | Arrasvuori et al. |
| 2007/0272458 A1 | 11/2007 | Taniguchi et al. |
| 2008/0006494 A1 | 1/2008 | Vandewal |
| 2008/0009992 A1 | 1/2008 | Izawa et al. |
| 2008/0015089 A1 | 1/2008 | Hurwitz et al. |
| 2008/0018065 A1 | 1/2008 | Hirao et al. |
| 2008/0029730 A1 | 2/2008 | Kamo et al. |
| 2008/0041677 A1 | 2/2008 | Namuduri |
| 2008/0059025 A1 | 3/2008 | Furuichi et al. |
| 2008/0067019 A1 | 3/2008 | Jensen et al. |
| 2008/0093820 A1 | 4/2008 | McAndrews |
| 2008/0096726 A1 | 4/2008 | Riley et al. |
| 2008/0099968 A1 | 5/2008 | Schroeder |
| 2008/0109158 A1 | 5/2008 | Huhtala et al. |
| 2008/0116622 A1 | 5/2008 | Fox |
| 2008/0119330 A1 | 5/2008 | Chiang et al. |
| 2008/0163718 A1 | 7/2008 | Chiang |
| 2008/0185244 A1 | 8/2008 | Maeda et al. |
| 2008/0200310 A1 | 8/2008 | Tagliabue |
| 2008/0250844 A1 | 10/2008 | Gartner |
| 2008/0254944 A1 | 10/2008 | Muri et al. |
| 2008/0303320 A1 | 12/2008 | Schranz et al. |
| 2008/0312799 A1 | 12/2008 | Miglioranza |
| 2008/0314706 A1 | 12/2008 | Lun et al. |
| 2009/0000885 A1 | 1/2009 | McAndrews |
| 2009/0001684 A1* | 1/2009 | McAndrews .......... B62K 25/08 280/276 |
| 2009/0020382 A1 | 1/2009 | Van Weelden et al. |
| 2009/0038897 A1 | 2/2009 | Murakami |
| 2009/0048070 A1 | 2/2009 | Vincent et al. |
| 2009/0069972 A1 | 3/2009 | Templeton et al. |
| 2009/0070037 A1 | 3/2009 | Templeton et al. |
| 2009/0071773 A1 | 3/2009 | Lun |
| 2009/0098981 A1 | 4/2009 | Del et al. |
| 2009/0118100 A1 | 5/2009 | Oliver et al. |
| 2009/0121398 A1 | 5/2009 | Inoue |
| 2009/0131224 A1 | 5/2009 | Yuen |
| 2009/0138157 A1 | 5/2009 | Hagglund et al. |
| 2009/0171532 A1 | 7/2009 | Ryan et al. |
| 2009/0192673 A1 | 7/2009 | Song et al. |
| 2009/0200126 A1 | 8/2009 | Kondo et al. |
| 2009/0236807 A1 | 9/2009 | Wootten et al. |
| 2009/0258710 A1 | 10/2009 | Quatrochi et al. |
| 2009/0261542 A1 | 10/2009 | McIntyre |
| 2009/0277736 A1 | 11/2009 | McAndrews et al. |
| 2009/0288924 A1 | 11/2009 | Murray et al. |
| 2009/0294231 A1 | 12/2009 | Carlson et al. |
| 2009/0302558 A1* | 12/2009 | Shirai .................... B62K 25/08 280/5.515 |
| 2009/0314592 A1 | 12/2009 | Nygren |
| 2009/0324327 A1 | 12/2009 | McAndrews et al. |
| 2010/0004097 A1 | 1/2010 | D'Eredita |
| 2010/0010709 A1 | 1/2010 | Song |
| 2010/0032254 A1 | 2/2010 | Anderfaas et al. |
| 2010/0044975 A1 | 2/2010 | Yablon et al. |
| 2010/0059964 A1 | 3/2010 | Morris |
| 2010/0066051 A1 | 3/2010 | Haugen |
| 2010/0109277 A1 | 5/2010 | Furrer |
| 2010/0133764 A1 | 6/2010 | Greaves |
| 2010/0139442 A1 | 6/2010 | Tsumiyama |
| 2010/0147640 A1 | 6/2010 | Jones et al. |
| 2010/0160014 A1 | 6/2010 | Galasso et al. |
| 2010/0170760 A1 | 7/2010 | Marking |
| 2010/0186836 A1 | 7/2010 | Yoshihiro et al. |
| 2010/0198453 A1 | 8/2010 | Dorogusker et al. |
| 2010/0207351 A1 | 8/2010 | Klieber et al. |
| 2010/0224454 A1 | 9/2010 | Chen et al. |
| 2010/0244340 A1 | 9/2010 | Wootten et al. |
| 2010/0252972 A1 | 10/2010 | Cox et al. |
| 2010/0276238 A1 | 11/2010 | Crasset |
| 2010/0276906 A1 | 11/2010 | Galasso et al. |
| 2010/0308628 A1 | 12/2010 | Hsu et al. |
| 2010/0314917 A1 | 12/2010 | Hsieh et al. |

(56) References Cited

U.S. PATENT DOCUMENTS

| | | |
|---|---|---|
| 2010/0327542 A1 | 12/2010 | Hara et al. |
| 2011/0067965 A1 | 3/2011 | McAndrews |
| 2011/0086686 A1 | 4/2011 | Avent et al. |
| 2011/0095507 A1 | 4/2011 | Plantet et al. |
| 2011/0097139 A1 | 4/2011 | Hsu et al. |
| 2011/0109060 A1 | 5/2011 | Earle et al. |
| 2011/0127706 A1 | 6/2011 | Sims et al. |
| 2011/0174582 A1 | 7/2011 | Wootten et al. |
| 2011/0202236 A1 | 8/2011 | Galasso et al. |
| 2011/0204201 A1 | 8/2011 | Kodama et al. |
| 2011/0214956 A1 | 9/2011 | Marking |
| 2011/0257848 A1 | 10/2011 | Shirai |
| 2011/0284333 A1 | 11/2011 | Krog et al. |
| 2011/0315494 A1 | 12/2011 | Marking |
| 2012/0006949 A1 | 1/2012 | Laird et al. |
| 2012/0007327 A1 | 1/2012 | Talavasek |
| 2012/0018263 A1 | 1/2012 | Marking |
| 2012/0018264 A1 | 1/2012 | King |
| 2012/0048665 A1 | 3/2012 | Marking |
| 2012/0080279 A1 | 4/2012 | Galasso et al. |
| 2012/0136537 A1 | 5/2012 | Galasso et al. |
| 2012/0181126 A1 | 7/2012 | De Kock |
| 2012/0222927 A1 | 9/2012 | Marking |
| 2012/0228906 A1 | 9/2012 | McAndrews et al. |
| 2012/0253599 A1 | 10/2012 | Shirai |
| 2012/0253600 A1 | 10/2012 | Ichida et al. |
| 2012/0274043 A1 | 11/2012 | Lee et al. |
| 2012/0305350 A1 | 12/2012 | Ricksen et al. |
| 2012/0312648 A1 | 12/2012 | Yu et al. |
| 2013/0001030 A1 | 1/2013 | Goldasz et al. |
| 2013/0037361 A1 | 2/2013 | Park et al. |
| 2013/0090195 A1 | 4/2013 | Yamaguchi et al. |
| 2013/0119634 A1 | 5/2013 | Camp et al. |
| 2013/0144489 A1 | 6/2013 | Galasso et al. |
| 2013/0168195 A1 | 7/2013 | Park et al. |
| 2013/0221713 A1 | 8/2013 | Pelot et al. |
| 2013/0292218 A1 | 11/2013 | Ericksen et al. |
| 2013/0333993 A1 | 12/2013 | Yu |
| 2014/0008160 A1 | 1/2014 | Marking et al. |
| 2014/0027219 A1 | 1/2014 | Marking et al. |
| 2014/0048365 A1 | 2/2014 | Kim |
| 2014/0061419 A1 | 3/2014 | Wehage et al. |
| 2015/0073656 A1 | 3/2015 | Takamoto et al. |
| 2015/0081171 A1 | 3/2015 | Ericksen et al. |
| 2015/0175236 A1 | 6/2015 | Walthert et al. |
| 2015/0179062 A1 | 6/2015 | Ralston et al. |
| 2015/0197308 A1 | 7/2015 | Butora et al. |
| 2015/0291248 A1 | 10/2015 | Fukao et al. |
| 2016/0025178 A1 | 1/2016 | Kamakura et al. |
| 2016/0031506 A1 | 2/2016 | Lloyd et al. |
| 2016/0076617 A1 | 3/2016 | Marking |
| 2016/0153515 A1 | 6/2016 | Ebersbach et al. |
| 2016/0153516 A1 | 6/2016 | Marking |
| 2016/0185178 A1 | 6/2016 | Galasso et al. |
| 2016/0265615 A1 | 9/2016 | Marking |
| 2016/0290431 A1 | 10/2016 | Marking |
| 2016/0319899 A1 | 11/2016 | Franklin et al. |
| 2016/0355226 A1 | 12/2016 | Pelot et al. |
| 2017/0008363 A1 | 1/2017 | Ericksen et al. |
| 2017/0136843 A1 | 5/2017 | Marking |
| 2017/0184174 A1 | 6/2017 | Marking |
| 2017/0247072 A1 | 8/2017 | Aird et al. |
| 2017/0259876 A1 | 9/2017 | Ericksen et al. |
| 2017/0282669 A1 | 10/2017 | Cox et al. |
| 2017/0291466 A1 | 10/2017 | Tong |
| 2018/0010666 A1 | 1/2018 | Marking |
| 2018/0031071 A1 | 2/2018 | Marking |
| 2018/0222541 A1 | 8/2018 | Madau et al. |
| 2018/0326805 A1 | 11/2018 | Marking |
| 2018/0326808 A1 | 11/2018 | Ericksen et al. |
| 2018/0328442 A1 | 11/2018 | Galasso et al. |
| 2018/0328446 A1 | 11/2018 | Ericksen et al. |
| 2018/0334007 A1 | 11/2018 | Ericksen et al. |
| 2018/0334008 A1 | 11/2018 | Ericksen et al. |
| 2018/0335102 A1 | 11/2018 | Haugen |
| 2018/0339565 A1 | 11/2018 | Ericksen et al. |
| 2018/0339566 A1 | 11/2018 | Ericksen et al. |
| 2018/0339567 A1 | 11/2018 | Ericksen et al. |
| 2018/0355943 A1 | 12/2018 | Cox |
| 2018/0355946 A1 | 12/2018 | Ericksen et al. |
| 2019/0030975 A1 | 1/2019 | Galasso et al. |
| 2019/0032745 A1 | 1/2019 | Marking |
| 2019/0176557 A1 | 6/2019 | Marking et al. |
| 2019/0184782 A1 | 6/2019 | Shaw et al. |
| 2019/0203798 A1 | 7/2019 | Cox et al. |

FOREIGN PATENT DOCUMENTS

| | | |
|---|---|---|
| DE | 3709447 A1 | 10/1988 |
| DE | 3711442 A1 | 10/1988 |
| DE | 3738048 A1 | 5/1989 |
| DE | 3924166 C1 | 2/1991 |
| DE | 4029090 A1 | 3/1992 |
| DE | 4406918 A1 | 9/1994 |
| DE | 202004005229 U1 | 8/2004 |
| DE | 10326675 A1 | 12/2004 |
| DE | 102005025811 A1 | 12/2006 |
| DE | 102007063365 A1 | 7/2009 |
| DE | 202008015968 U1 | 4/2010 |
| DE | 202010012738 U1 | 12/2010 |
| EP | 207409 A2 | 1/1987 |
| EP | 304801 A2 | 3/1989 |
| EP | 3403803 A1 | 12/1990 |
| EP | 552568 A1 | 7/1993 |
| EP | 0735280 A2 | 10/1996 |
| EP | 1050696 A2 | 11/2000 |
| EP | 1138530 A2 | 10/2001 |
| EP | 1188661 A2 | 3/2002 |
| EP | 1241087 A1 | 9/2002 |
| EP | 1355209 A1 | 10/2003 |
| EP | 1394439 A1 | 3/2004 |
| EP | 1449688 A2 | 8/2004 |
| EP | 1623856 A2 | 2/2006 |
| EP | 1757473 A2 | 2/2007 |
| EP | 1825220 A2 | 8/2007 |
| EP | 2103512 A2 | 9/2009 |
| EP | 2116739 A2 | 11/2009 |
| EP | 2189191 A2 | 5/2010 |
| EP | 2248691 A1 | 11/2010 |
| EP | 2357098 A2 | 8/2011 |
| EP | 2410203 A2 | 1/2012 |
| EP | 2479095 A2 | 7/2012 |
| EP | 2495472 A2 | 9/2012 |
| EP | 2357098 B1 | 10/2014 |
| EP | 2848582 A1 | 3/2015 |
| FR | 1343760 A | 11/1963 |
| FR | 2432424 A1 | 2/1980 |
| FR | 2529002 A2 | 12/1983 |
| FR | 2617928 A1 | 1/1989 |
| FR | 2952031 A1 | 5/2011 |
| GB | 2104183 A | 3/1983 |
| GB | 2159604 A | 12/1985 |
| GB | 2180320 A | 3/1987 |
| GB | 2289111 A | 11/1995 |
| JP | 57173632 A | 10/1982 |
| JP | 57173632 U | 11/1982 |
| JP | 57182506 A | 11/1982 |
| JP | 01106721 A | 4/1989 |
| JP | H0193637 A | 4/1989 |
| JP | H02168038 A | 6/1990 |
| JP | H03113139 A | 5/1991 |
| JP | 04203540 A | 7/1992 |
| JP | 05149364 A | 6/1993 |
| JP | 06101735 A | 4/1994 |
| JP | 06185562 A | 7/1994 |
| JP | H084818 A | 1/1996 |
| JP | 2005119548 A | 5/2005 |
| JP | 2005119549 A | 5/2005 |
| JP | 2007302211 A | 11/2007 |
| JP | 2008238921 A | 10/2008 |
| KR | 20070076226 A | 7/2007 |
| KR | 20100041679 A | 4/2010 |
| RU | 2469224 C1 | 12/2012 |
| WO | 9840231 A2 | 9/1998 |

(56) References Cited

FOREIGN PATENT DOCUMENTS

| WO | 99/06231 | | 2/1999 |
|---|---|---|---|
| WO | 0027658 | A1 | 5/2000 |
| WO | 03070546 | A1 | 8/2003 |
| WO | 2007017739 | A2 | 2/2007 |
| WO | 2007117884 | A2 | 10/2007 |
| WO | 2008086605 | A1 | 7/2008 |
| WO | 2008114445 | A1 | 9/2008 |
| WO | 2013066159 | A1 | 5/2013 |

OTHER PUBLICATIONS

European Search Report for European Application No. 19206334.5, 6 pages, May 12, 2020 (May 12, 2020).
European Search Report for European Application No. 19212356.0, 8 pages, May 7, 2020 (May 7, 2020).
Machine translation DE3613386; Oct. 1986.
Machine translation EP 0403803; Dec. 1990.
Machine translation KR20100041679; Apr. 2010.
European Search Report for European Application No. 19157767, filed Oct. 16, 2019, 9 Pages.
Thum, "Oppostion Letter Against EP2357098", Dec. 17, 2019, 25 Pages.
Electronic Translation of DE3709447A1.
English language abstract for EP 0207409 (no date).
Fachkunde Fahrradtechnik 4 Auflage, Gressmann_Inhaltv und S, 2011, 206-207.
Statement of Grounds of Appeal, EP App. No. 11153607.4, May 28, 2018, 88 Pages.
European Search Report, European Patent Application No. 14189773. 6, dated May 4, 2015, 4 Pages.
Grounds of Appeal, EP App. No. 11153607.4, Jun. 1, 2018, 28 Pages.
EP Search Report for European Application No. 15163428.4, dated Jul. 3, 2017, 7 Pages.
"17 Years of Innovation and Still Evolving", https://www.powertap.com/post/blog-15-17-years-of-innovation-and-still-evolving, Nov. 28, 2018, 8 Pages.
"ANT Message Protocol and Usage", Dynastream Innovations, Inc., Jul. 2, 2007, 68 Pages.
"Basis for Claims Filed Jan. 15, 2023", European Patent Application No. 14189773.6, 2 Pages.
"Communication Re Oral Proceedings for European Application No. 10161906, dated Feb. 15, 2013 (Feb. 15, 2013)".
"European Patent Office Final Decision dated Mar. 21, 2013", European Patent Application No. 10161906.2.
"European Search Report for European Application No. 09159949 , 2 pages, dated Sep. 11, 2017 (dated Sep. 11, 2017)".
"European Search Report for European Application No. 09177128, 4 pages, dated Aug. 25, 2010 (dated Aug. 25, 2010)".
"European Search Report for European Application No. 10161906 , 3 pages, dated Sep. 15, 2010 (dated Sep. 15, 2010)".
"European Search Report for European Application No. 10187320, 12 pages, dated Sep. 25, 2017 (dated Sep. 25, 2017)".
"European Search Report for European Application No. 11153607, 3 pages, dated Aug. 10, 2012 (dated Aug. 10, 2012))".
"European Search Report for European Application No. 11172553, 2 pages, dated Sep. 25, 2017 (dated Sep. 25, 2017)".
"European Search Report for European Application No. 11172612 , 2 pages, dated Oct. 6, 2011 (dated Oct. 6, 2011))".
"European Search Report for European Application No. 11175126, 2 pages, dated Sep. 25, 2017 (dated Sep. 25, 2017)".
"European Search Report for European Application No. 11275170 , 2 pages dated Jan. 10, 2018 (dated Jan. 10, 2018)".
"European Search Report for European Application No. 12170370 , 2 pages dated Nov. 15, 2017 (dated Nov. 15, 2017)".
"European Search Report for European Application No. 12184150, 10 pages, dated Dec. 12, 2017 (dated Dec. 12, 2017)".
"European Search Report for European Application No. 13158034 , 4 pages dated Jun. 28, 2013 (dated Jun. 28, 2013))".
"European Search Report for European Application No. 13174817. 0, 13 pages, dated Jan. 8, 2018 (dated Jan. 8, 2018))".
"European Search Report for European Application No. 13189574, 2 pages, dated Feb. 19, 2014 (dated Feb, 19, 2014)".
"European Search Report for European Application No. 15167426 , 4 pages, dated Sep. 18, 2015 (dated Sep. 18, 2015))".
"European Search Report for European Application No. 16167306 , 2 pages, dated Mar. 23, 2017 (dated Mar. 23, 2017)".
"European Search Report for European Application No. 17154191, 2 pages, dated Jun. 28, 2017 (dated Jun. 28, 2017)".
"European Search Report for European Application No. 17188022 , 9 pages, dated Feb. 1, 2018 (dated Feb. 1, 2018))".
"European Search Report and Written Opinion, European Patent Application No. 13165362.8", dated Sep. 24, 2014, 6 Pages.
"European Search Report for EP Application No. 18154672, 3 pages, dated Aug. 28, 2018 (dated Aug. 28, 2018))".
"Office Action for European Application No. 13158034.2, 5 pages, dated May 22, 2014".
"The Lee Company Technical Hydraulic Handbook", 1996, 1-696.
Healey, "The Tyre as Part of the Suspension System", The Institution of Automobile Engineers, Nov. 1924, 26-128.
Kasprzak, "Understanding Your Dampers: A guide from Jim Kasprzak", http://www.kaztechnologies.com/downloads/kaz-tech-tips/ Accessed: Oct. 24, 2018, 25 pages.
Litchfield, "Pneumatic Tires", Transactions (Society of Automobile Engineers), vol. 8, Part II, 1913, 208-223.
Nilsson, "Opposition Letter Against EP-2357098", Oct. 13, 2017, 7.
Puhn, "How To Make Your Car Handle", HPBooks, 1981, 7 Pages.
Shiozaki, et al., "SP-861-Vehicle Dynamics and Electronic Controlled Suspensions SAE Technical Paper Series No. 910661", International Congress and Exposition, Detroit, Mich., Feb. 25-Mar. 1, 1991.
Smith, ""The Bump Stop" in Engineer to win—Chapter 13: Springs and Shock Absorbers", MBI Publishing Company and Motorbooks, USA XP055430818, ISBN: 978-0-87938-186-8, Dec. 31, 1984, 207.
Thum, Notice of Opposition to a European Patent, EP App. No. 14189773.6, dated Dec. 13, 2018, 49 Pages.
Thum, "Oppostion Letter Against EP2357098", Oct. 16, 2018, 39.
Waechter, et al., "A Multibody Model for the Simulation of Bicycle Suspension Systems", Vehicle System Dynamics, vol. 37, No. 1, 2002, 3-28.

* cited by examiner

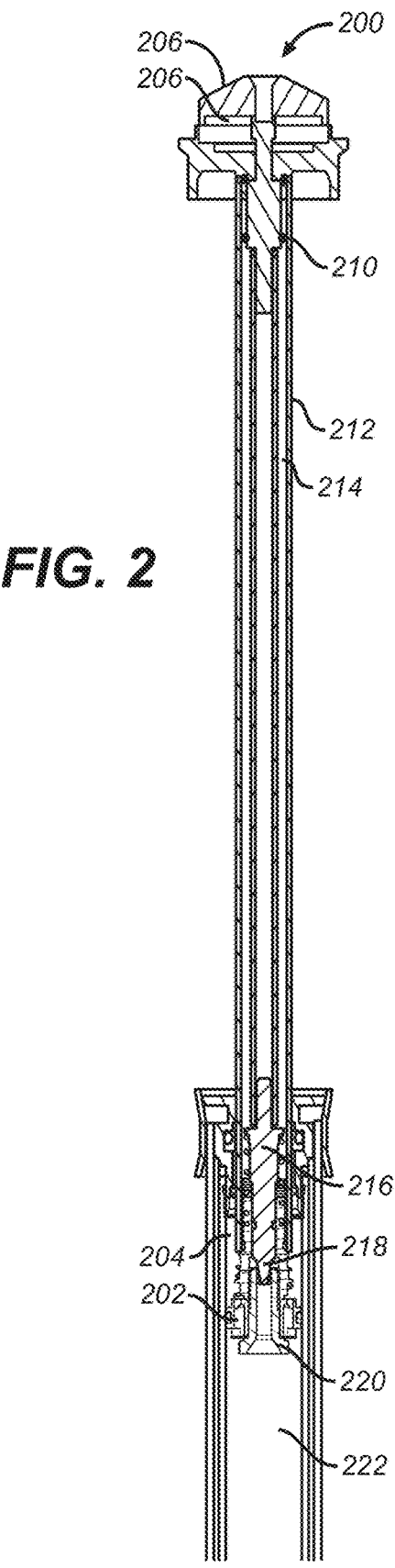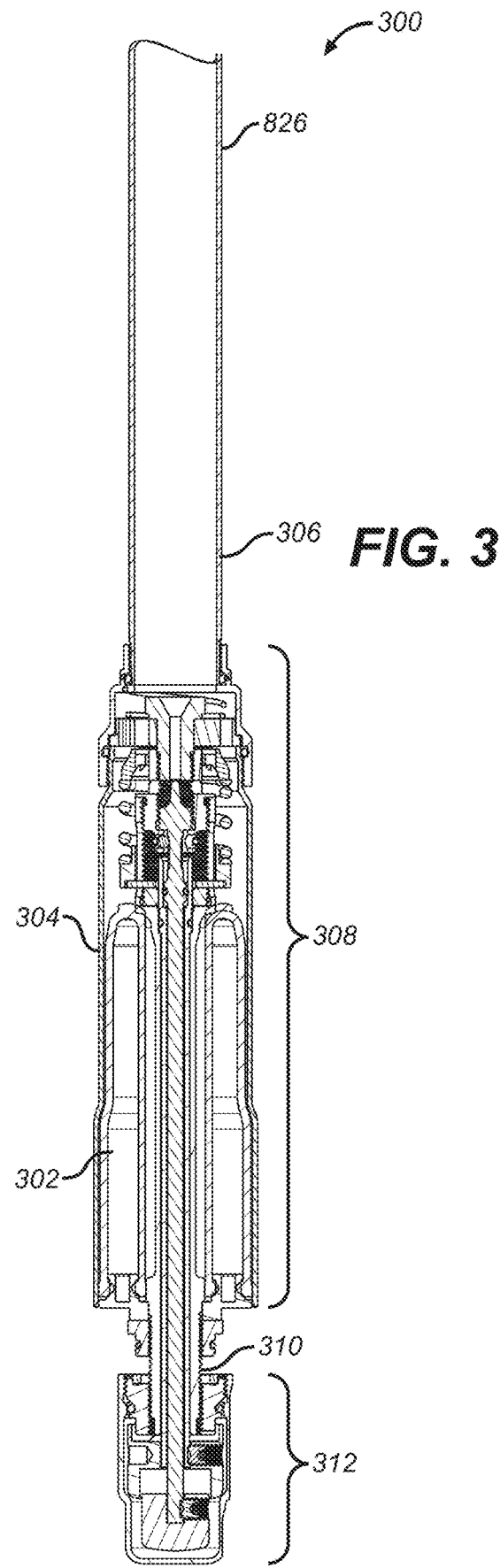

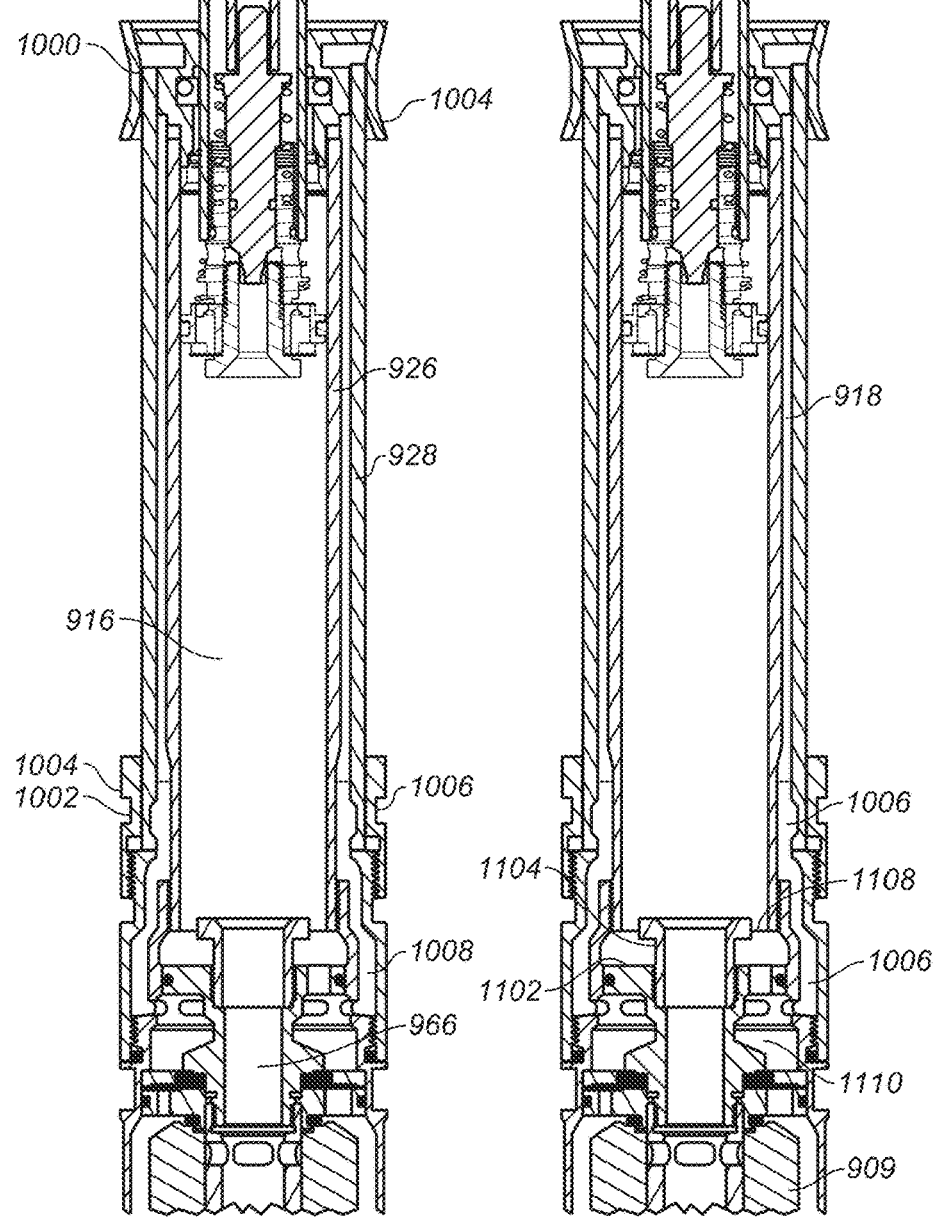

SUSPENSION SYSTEM

CROSS-REFERENCE TO RELATED APPLICATIONS

This application is a continuation application of and claims the benefit of co-pending U.S. patent application Ser. No. 16/243,911 filed on Jan. 9, 2019, entitled "SUSPENSION SYSTEM" by Andrew Laird, which is incorporated herein, in its entirety, by reference and is assigned to the assignee of the present application.

The U.S. patent application Ser. No. 16/243,911 is a continuation application of and claims the benefit of U.S. patent application Ser. No. 14/920,175 filed on Oct. 22, 2015, now U.S. Pat. No. 10,180,171, entitled "SUSPENSION SYSTEM" by Andrew Laird, which is incorporated herein, in its entirety, by reference and is assigned to the assignee of the present application.

The U.S. patent application Ser. No. 14/920,175 is a continuation application of and claims the benefit of U.S. patent application Ser. No. 14/079,014 filed on Nov. 13, 2013, now U.S. Pat. No. 9,194,456, entitled "SUSPENSION SYSTEM" by Andrew Laird, which is incorporated herein, in its entirety, by reference and is assigned to the assignee of the present application.

The U.S. patent application Ser. No. 14/079,014 is a continuation application of and claims the benefit of U.S. patent application Ser. No. 12/903,022 filed on Oct. 12, 2010 and is now issued U.S. Pat. No. 8,672,106, entitled "SELF-REGULATING SUSPENSION" by Andrew Laird, and assigned to the assignee of the present application which is incorporated herein, in its entirety, by reference.

The U.S. Pat. No. 8,672,106 claims priority to and the benefit of U.S. Provisional Patent Application 61/250,999 filed on Oct. 13, 2009 entitled "SELF-REGULATING SUSPENSION" by Andrew Laird, which is incorporated herein, in its entirety, by reference and is assigned to the assignee of the present application.

FIELD OF THE INVENTION

Embodiments of the invention generally relate to methods and apparatus for use in suspension assemblies. Particular embodiments of the present technology relate to methods and apparatus useful for adjusting damping characteristics of vehicle suspension systems.

BACKGROUND

Vehicles, including wheeled vehicles, are typically suspended to absorb shock encountered while traversing uneven terrain. Fundamental vehicle suspensions for controlling vehicle body motion and handling characteristics during vehicle travel over uneven surface are well-known in the art. Wheeled vehicles usually include one vehicle suspension assembly per wheel so that each wheel may absorb shock independently. Vehicle suspensions typically comprise many components, including a hydraulic cylinder with an internal piston connected to a central piston rod, which reciprocates within the cylinder to produce damping forces.

Damping forces created by the vehicle suspension have a major influence on the overall dynamic performance of a vehicle. A wide range of dynamic conditions are encountered during typical vehicle motion over various surface and terrain features. For example, these features and conditions include large and small bumps, sharp-edged bumps and round-edged bumps, close-spaced bumps and wide spaced bumps, stutter bumps and gradual undulating bumps, dips, depressions, crevices and so forth. Thus, the vehicle suspension undergoes a wide range of tough conditions that puts pressure on the functionality of its internal components. What is needed are vehicle suspension assemblies that better accommodate these performance requirements, as there exists many limitations to the present state of vehicle suspension technology.

BRIEF DESCRIPTION OF THE DRAWINGS

FIG. 2 is a cross-sectional view of a fork damping cartridge.

FIG. 3 is a cross-sectional view of a fork damping cartridge.

FIG. 10 is a cross-sectional view of a damping cartridge, in accordance with embodiments of the present technology.

FIG. 11 is a cross-sectional view of a damping cartridge, in accordance with embodiments of the present technology.

The drawings referred to in this description should not be understood as being drawn to scale unless specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

The discussion will begin with a brief overview of a vehicle wheel suspension. The discussion will then focus on embodiments of the present technology for a self-regulating suspension that provides for damping assemblies arranged in parallel within the vehicle suspension, thereby providing a greater traveling area for piston movement.

In general, vehicle wheel suspensions includes a damping mechanism for dissipating energy (inertial wheel movement induced by disparities in the terrain over which the vehicle travels) and a spring mechanism for storing energy to rebound a compressed suspension to an uncompressed state and to provide additional resistance to compression. Damping assemblies convert wheel movement into heat primarily by means of fluid friction in a dashpot type device. Spring mechanisms may take many forms including, coiled springs, elastomer bumpers, compressible fluid (e.g. gas, silicone oil), suitable combinations thereof or other suitable energy storage mechanisms.

Figure 1:
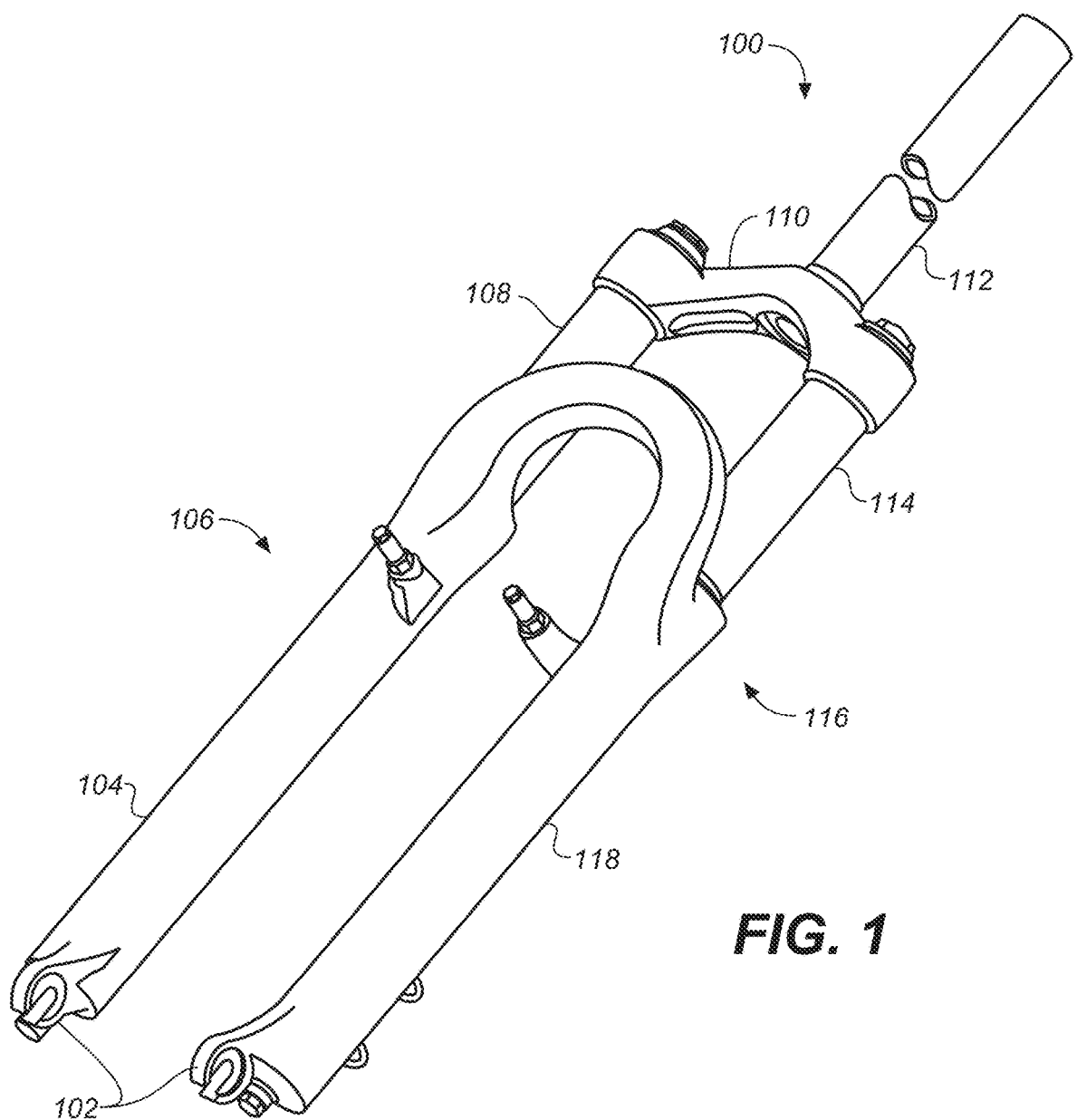
FIG. 1 is a perspective view of a fork.

Vehicles having a single front wheel, such as for example motorcycles and bicycles, often have front suspension assemblies in the form of a "fork" 100 as shown in FIG. 1. FIG. 1 is a perspective view of a type of fork 100. The fork 100 includes lower leg tubes 104 and 118 having upper leg tubes 108 and 114 telescopically engaged respectively therewith. The crown 110 holds the telescopic fork legs in spaced relation to the steering tube 112. The drop outs 102 accommodate the axle of a front bicycle wheel. The fork 100 shown includes right leg 106 and left leg 116, The fork 100 is similar to suspension disclosed in U.S. Pat. No. 7,163,222 which Patent is incorporated herein, in its entirety, by reference.

FIGS. 2 and 3 show a cross-sectional view of an exemplary fork damping cartridge, 200 and 300, respectively, that includes the internal workings of at least one leg of a bicycle fork (or motorcycle fork). Although the damping cartridge 200 and 300 may function inside a single legged fork or shock absorber, the damping cartridge 200 and 300 may also be installed inside one or more telescoping legs of the fork 400 of FIG. 4 (a two-legged fork 402).

The top cap 206 includes male threads and an outer diameter o-ring seal. The top cap 206 is threaded into sealing engagement with an inner diameter of an upper leg tube (that extends through a crown, both not shown). The top cap 206 anchors the upper end of the cartridge axially to the upper end of the upper leg tube. The lower end of the cartridge includes a shaft 310 and a nut assembly 312 threaded onto the shaft 310. The shaft 310 extends through a hole in the bottom of a lower leg tube that the cartridge is substantially inside a combination of the lower leg tube and an upper leg tube telescopically engaged therewith. The nut assembly 312 is threaded onto the shaft 310 from outside the lower leg tube and the cartridge is thereby anchored axially to the bottom of the lower leg tube.

Referring still to FIGS. 2 and 3, the top cap 206 is connected to the piston rod 212, which in turn is connected to the piston assembly 202. The top cap 206 has an adjuster knob 208, which is connected to an adjuster plug 210. The adjuster plug 210 axially abuts an adjustment shaft 214 which in turn axially abuts a needle body 216. The needle body 216 includes the needle 218 which is disposed in variable axial relation within the orifice 220 of the piston assembly 202. The nut assembly 312 is connected to the shaft 310, which, through the lower damper 308 internal parts, is connected to the lower damper body 304, which is in turn connected to the damper body 306. Although the adjuster knob 208, adjuster plug 210, adjustment shaft 214, needle body 216 and needle 218 are axially movable relative to the top cap 206, the piston rod 212, the piston assembly 202 and the orifice 220, all of these move together axially in telescopic relation to the damper body 306.

During operation, the damper leg of the fork is subject to compression and rebound loads. The compression is induced by disparities in the terrain being traversed by a vehicle equipped with the fork. The rebound is induced by a spring (e.g., gas spring, mechanical spring, coil [not shown]), preferably located in another leg of the fork, which stores energy during compression of the fork and then releases that energy when the disparity is passed. The energy is released in urging the suspension unit to elongate axially following the axial compression during which the energy is stored. The top cap 206 and its connected parts (as disclosed herein) move with the upper leg tube during compression and rebound and the nut assembly 312 and its connected parts (as disclosed herein) move with the lower leg tube.

Movement of the upper leg tube relative to the lower leg tube causes the piston assembly 202 to move axially within the damper body 306. During a compression stroke, the piston assembly 202 moves downward in the damper body 306 and thereby reduces the volume of the compression chamber. As fluid is displaced from the compression chamber, some of it flows through passages and deflects from the one way shim stack valve to enter the rebound chamber 204. Some of the displaced fluid flows through the orifice 220 and into the lower damper 308. The resistance to movement of the fluid from the compression chamber, through the passages (and shim valve on piston) and the orifice 220 provide compression damping for the suspension unit in which the damper cartridge is included.

Referring still to FIGS. 2 and 3, during a rebound stroke, the piston assembly 202 moves upward in the damper body 306 and thereby increases the volume of the compression chamber. As fluid is displaced from the rebound chamber 204, it flows through apertures and into an annular volume. It then flows past the needle 218, through channels and the orifice 220 to enter the compression chamber. Also, the previously displaced fluid flows through the orifice 220 from the lower damper 308 and back into the compression chamber. The resistance to movement of the fluid from the rebound chamber 204, through the channels and the orifice 220 provide rebound damping for the suspension unit in which the damper cartridge is included.

Referring again to FIGS. 2 and 3, an alternative to the internal floating piston is an outer flexible tubing that is located within the lower damper body 304 and provides a compensation chamber for the volume of the shaft 310 as it enters the fluid reservoir 222 during compression. Another term used for the fluid reservoir is a "compressible chamber". The outer flexible tube 302 includes an elastic material or structure, for example an elastomeric toroid or semi-toroid or a metallic or plastic bellows or any other suitable structure or material. An interior of the outer flexible tube 302 is charged with a compressible fluid at an initial pressure. As the shaft 310 enters the compression chamber during compression, fluid flows from the compression chamber into the lower damper body 304 and the volume of the outer flexible tube 302 is reduced correspondingly as the gas within the outer flexible tube 302 is compressed. Such gas compression correspondingly raises the ambient pressure within the compression chamber and rebound chamber 204.

Figure 5:
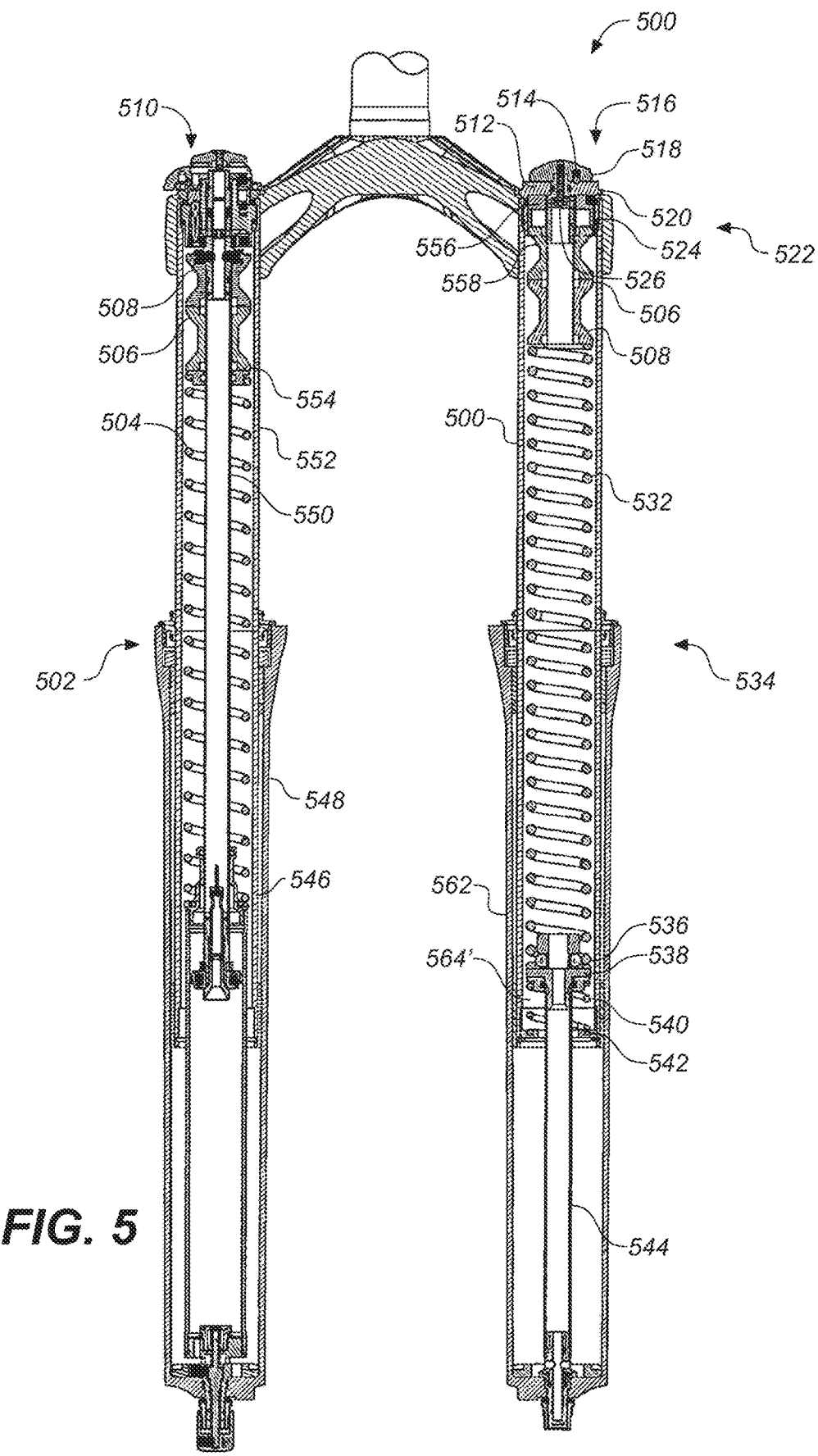
FIG. 5 is a cross-sectional view of a fork having a coil-sprung embodiment.
Figure 6:
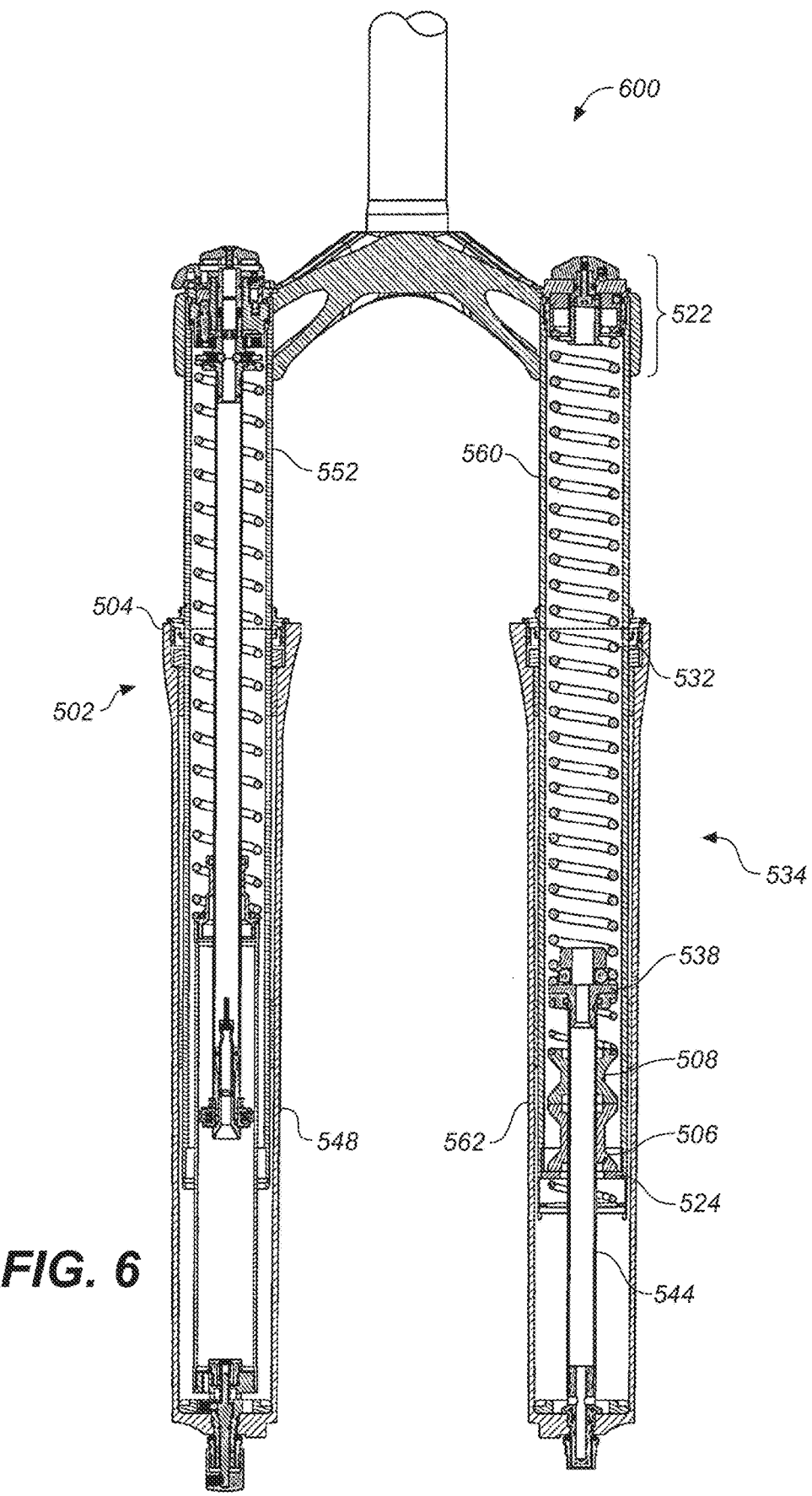
FIG. 6 is a cross-sectional view of a fork having a coil-sprung embodiment.

FIGS. 5 and 6 show embodiments of a suspension that may be adapted for use with the systems and mechanisms described herein. FIGS. 5 and 6 illustrate a coil-sprung embodiment of the two legged fork 100 of FIG. 1, indicated generally by reference characters 500 and 600 respectively.

The forks, 500 and 600, coil-sprung fork embodiments, utilize a pair of positive coil springs to provide an expansion force on the fork. A first spring 504 is located in the right fork leg, while a second spring 532 is located in the left leg 534. An air spring arrangement may be used in lieu of or in conjunction with a coiled spring. With a coil spring, first spring 504, second spring 532 located in each of the fork legs, right leg 502, left leg 534, respectively, the expansion force on the fork 500, 600 is substantially balanced between the fork legs, right leg 502, left leg 534. This enhances the coaxial telescopic motion of the upper legs, upper leg tube 552 and upper leg tube 560 relative to the lower leg tubes 548, lower leg tube 548 and 562 during compression and rebound for smooth motion with reduced binding.

The first spring 504 is positioned in the right leg 502 between the damper cap assembly 510 and the cartridge tube cap 546. A pair of spacers, including a first spacer 508 and a second spacer 506, are interposed between the damper cap assembly 510 and the first spring 504. In one embodiment the spacers, first spacer 508 and second spacer 506 are substantially C-shaped so that they may be easily removed from the damper shaft 550 in a radial direction. Optionally, the spacers, first spacer 508 and second spacer 506, are configured to engage the damper shaft 550 in a snap fit attachment.

An upper spring guide 554 is positioned between the first spring 504 and the spacer immediately adjacent the first spring 504 (second spacer 506 in the illustrated embodiment) to assist in keeping the first spring 504 concentric with the damper shaft 550. The cartridge tube cap 546 functions as an upper spring guide 554 for the lower end of the first spring 504. However, a separate spring guide 554 member may also be provided.

A second spring 532 is positioned in the left leg 534 between the spring cap assembly 522 and the upper spring stop 542. A first spacer 508 and a second spacer 506 are positioned between the spring cap assembly 522 and the second spring 532. In one embodiment, the first and second spacers 508 and 506, respectively, are substantially identical to the spacers described above in relation to the first spring 504.

A preload adjuster assembly 516 is provided to allow adjustment of the preload on the second spring 532. The preload adjuster assembly 516 generally comprises an adjuster cap 512, an adjuster shaft 558, a barrel 556 and an adjuster knob 518. The adjuster cap 512 is sealingly engaged with upper open end of the upper leg tube 560. The adjuster cap 512 includes a central aperture which allows the adjuster shaft 558 to pass through while in a sealed arrangement. The adjuster knob 518 is fixed to the adjuster shaft 558 by a fastener 526 such that rotation of the adjuster knob 518 results in the rotation of the adjuster shaft 558. A ball detent assembly 514, substantially similar to those described above, may be provided between the adjuster cap 512 and the adjuster knob 518 to define a plurality of preload adjustment positions.

The barrel 556 is threadably engaged with the adjuster shaft 558 and engages the second spacer. In addition, the barrel 556 includes a ball pocket for holding a ball bearing 520, which rides within an axial groove 524 defined by the adjuster cap 512. This arrangement prevents the barrel 556 from rotating relative to the adjuster cap 512. Accordingly, rotation of the adjuster shaft 558, via the adjuster knob 518, results in translation of the barrel 556 relative to the adjuster cap 512. A change in the axial position of the barrel 556 alters the preload force on the second spring 532.

The upper spring stop 542 is attached (e.g. roll-crimped) to a plunger rod 544 which extends upward from the closed end of the lower leg tubes 548 and 562. The upper spring stop 542 includes an O-ring 536 which serves as an upper spring guide 554 for the lower end of the second spring 532. The O-ring 536 is preferred because it's compressibility allows a single size of O-ring to accommodate a number of different spring inner diameters. The inner diameter of a spring may vary with different spring rates, therefore, the O-ring 536 allows a number of first and second springs 504 and 532, respectively, having varying spring rates to be used with fork. A negative spring chamber 564 is defined between the upper spring stop 542 and the lower spring stop 542. In one embodiment a single negative spring 540 is provided, rather than the dual negative coil spring arrangement of previous embodiments.

Figure 4:
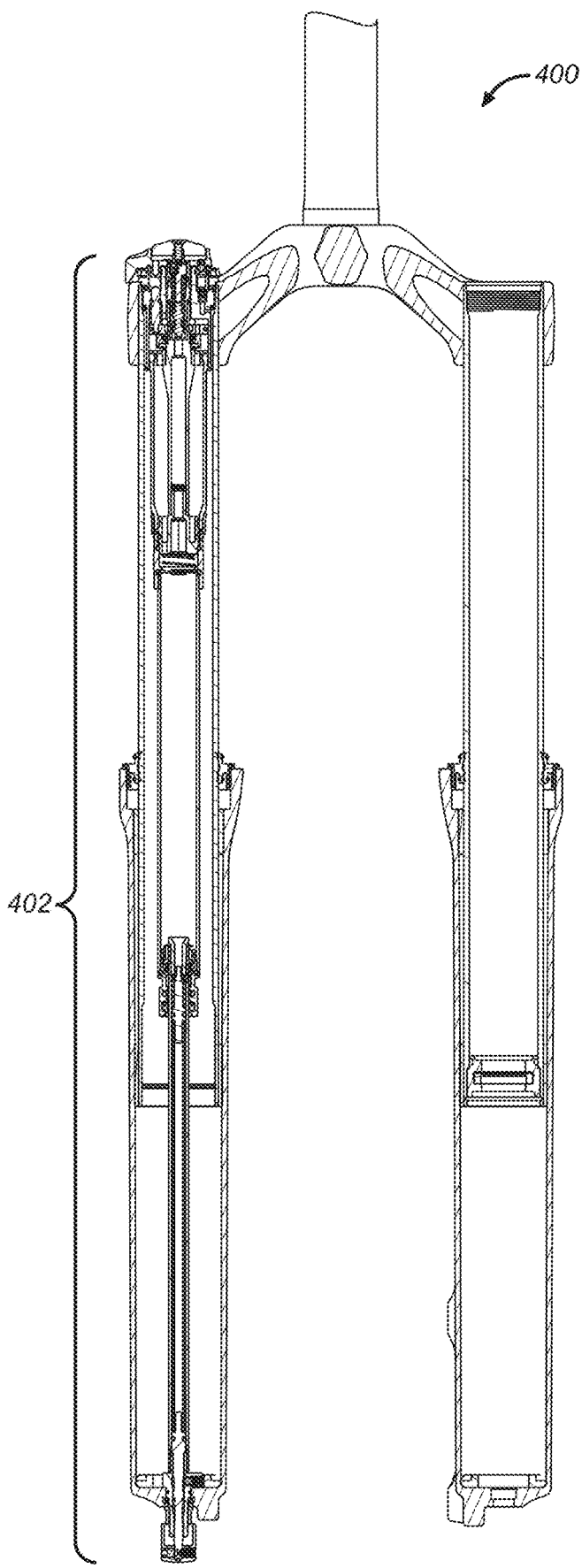
FIG. 4 is a cross-sectional view of one telescoping leg of a fork.

The forks 500 and 600 of FIGS. 5 and 6, respectively, are capable of being adjusted for varying amounts of travel, or total distance between it's fully compressed and fully extended positions. With reference to FIG. 4, the fork therein has been configured to have less travel than the fork as configured in FIG. 3. To accomplish this, the first and second spacers 508 and 506, respectively, of the left leg 534 were moved from their position between the upper end of the second spring 532 and the spring cap assembly 522 to a position below the plunger rod 544. Specifically, the upper spring guide is slid downward on the plunger rod 544 and the first and second spacers 508 and 506, respectively, are positioned between the upper spring guide and the upper spring stop 542. This lowers the upper leg tubes 552 and 560, relative to the lower leg tubes 548 and 562, and shortens the travel of the fork by the combined length of the first and second spacers 508 and 506, respectively. In order to accommodate the shorter travel configuration without altering the preload on the first spring 504, the spacers, (FIG. 5) are removed from the right leg 502.

In one embodiment, the first spacer 508 is approximately 20 mm in length and the second spacer 506 is approximately 25 mm in length. The travel for the fork as configured in FIG. 5 is approximately 125 mm. As configured in FIG. 4, the travel is reduced to 80 mm. Optionally, only one of the first and second spacers 508 and 506, respectively, may be positioned below the upper spring stop 542 while the other spacer remains positioned above the upper stop. With this configuration, the fork travel would be shortened by the length of the spacer positioned below the upper spring stop 542, either 20 mm or 25 mm. The corresponding first and second spacers 508 and 506, respectively, may be removed from the right leg 502, to maintain the desired preload on the first spring 504, as described above. Additionally, varying spacer configurations may be used. For example, the first and second spacers 508 and 506, respectively, may be replaced by a single spacer. Also, spacers of other lengths may be used.

Figure 7:
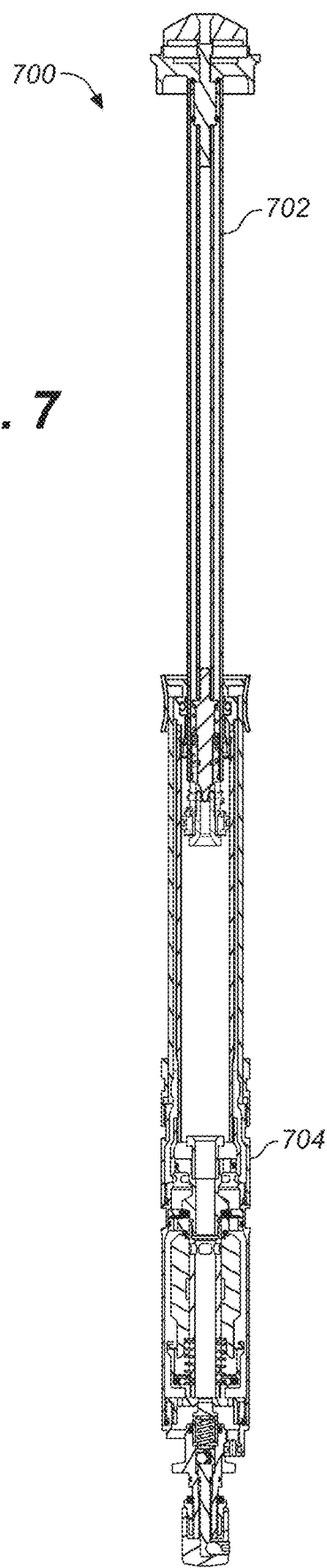
FIG. 7 is a cross-sectional of a leg tube of a fork.
Figure 8:
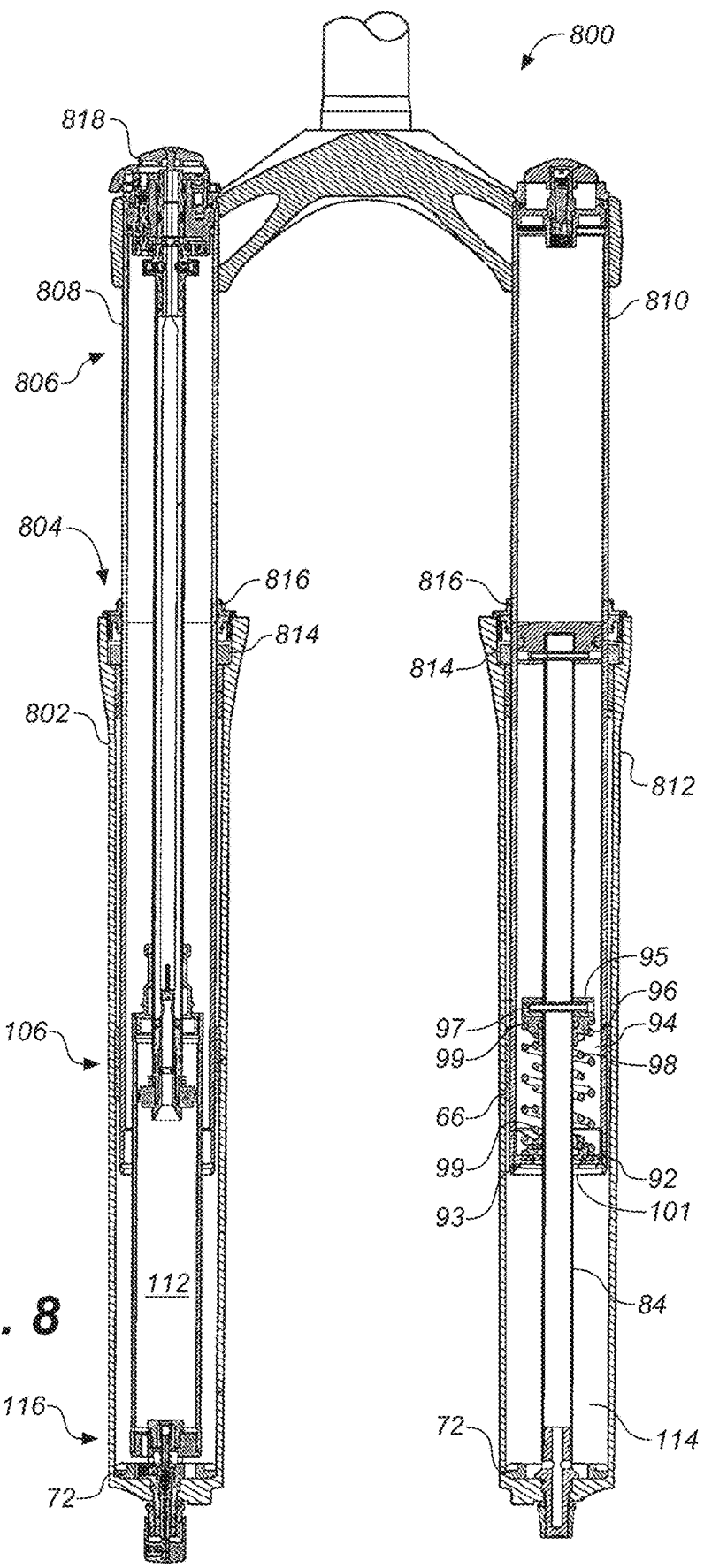
FIG. 8 is a cross-sectional view of a damping assembly with the leg tube of FIG. 7.

FIGS. 7 and 8 show cross-sectional views of one leg of a fork 700 and a damping assembly 800, respectively, in embodiments of the present technology. In relevant detail, as shown in FIG. 8, are lower left and right leg tubes 802 and 812, respectively, having upper left and right leg tubes 808 and 810, respectively, telescopically engaged respectively therewith. In the asymmetric fork embodiment of FIG. 8, right leg 806 comprises a damping assembly while left leg comprises a spring assembly. Optionally, one or each (both) legs may comprise both a damping and spring assembly.

FIG. 8 shows other components of a fork 800 that are not described in detail, but are depicted nonetheless for contextual purposes. These components are damper cap assembly 818, and damper assembly 804 of right leg. Each for leg comprises a seal and wiper assembly, located at the entrance or upper opening of each lower left and right leg tube, 802 and 812, respectively, to seal the telescopic leg and to keep debris out of the telescopic leg. The seal assembly seals against an outer surface of the upper left and right leg tubes 808 and 810, respectively, as it moves telescopically relative to the opening. In the shown embodiment, the seal assembly comprises wiper seal 816 and foam ring 814.

FIG. 7 shows a damper interoperable with a piston rod 702 within a leg of a suspension fork, according to one embodiment of the present technology. Referring to FIGS. 7 and 8, the upper left leg tube 808 telescopes in and out of the lower left leg tube 802 in response to bumps or depressions that are encountered by a wheel attached to the drop out (from FIG. 1) of the lower left leg tube 802. Such forces are transmitted to the piston rod 702 and lower cartridge 704 since the piston rod 702 is fixed relative to the upper left leg tube and the lower cartridge 704 is fixed relative to the lower left leg tube 802 that results in a compression force (telescopes in) or tensile force (telescopes out) respectively between the piston rod 702 and the lower cartridge 704.

Currently, damping assemblies are arranged linearly, and therefore utilize space within a fork leg that would otherwise be used to accommodate a piston traveling within a compression chamber. Embodiments of the present technology arrange damping assemblies in parallel with each other, thereby opening up space with a fluid reservoir for receiving a piston traveling there through.

In one embodiment, the isolated suspension location is positioned along the outer edge of a cylinder (comprising a compression chamber) within a fork leg, and includes an outer wall made of flexible tubing that is designed to expand outward in response to an entry of damping fluid into the isolated suspension location. Thus, for example, when a lower leg telescopically receives an upper leg during compression, the piston of the upper leg moves into a compression chamber (hereinafter, "fluid reservoir") of the lower leg that is filled with damping fluid. The movement of this piston therein causes the damping fluid to move along a fluid flow circuit from the fluid reservoir and through an inertia valve. If the pressure on the damping fluid caused by the compression exceeds a predetermined threshold, the inertia valve is caused to open such that the damping fluid is able to travel to an isolated suspension location positioned along the outer edge of the cylinder.

Once in the isolated suspension location, the damping fluid accumulates and causes the flexible tubing enclosing a portion of the isolated suspension location to expand outwards while at the same time providing resistance and thus a damping effect. A flow regulator (e.g., a one-way shim stack valve is located between the inertia valve and the fluid reservoir). This flow regulator applies another damping influence on the damping fluid flowing through the fluid flow circuit towards the isolated suspension location. Further, this flow regulator is adjustable, thereby enabling the adjustment of a damping rate applied by the flow regulator onto the damping fluid.

In one embodiment, when the inertia valve is in a "lockout" state, telescopically engaging movement between the two fork legs is inhibited. However, a blow-off valve that is positioned in series with the inertia valve and with the flow regulator operates to displace the damping fluid to the isolated suspension location when a predetermined threshold is reached or exceeded.

For example, when the damping fluid pressure in the fluid reservoir is above a predetermined threshold, a piston is forced away from a piston seat and allows damping fluid to flow through an inertia valve opening and through radial ports in the inertia valve body and into the isolated suspension location, thus lowering the pressure within the compression chamber.

However, when the inertia valve is in a lock-out state, the cylinder of the lower fork leg is at a closed position, and the flow of hydraulic fluid is prevented through the low, mid and high-speed compression circuits. Thus, the fork is also in a lock-out state, where substantially no relative motion is permitted between the upper leg tubes and the lower leg tubes and. This prevents rider pedal energy from being absorbed by the fork, thereby allowing such energy to instead promote forward motion of the bicycle.

If a large bump is encountered, such that the pressure within the fluid reservoir rises above the threshold necessary to open the blow-off valve, the blow-off valve operates to allow fluid flow from the fluid reservoir to the isolated suspension location. This prevents damage to the various seals of the fork and prevents the entire force of the bump from being transferred to the rider.

Thus, embodiments of the present technology provide a self-regulating suspension system that includes an inertia valve and blow-off valve positioned in parallel with each other and a flow regulator positioned in series with each of the inertia valve and the blow-off valve (and the fluid flow associated with the valves). This unique design enables more travel room in the compression chambers for movement of a piston, thereby providing a more consistent damping rate response to movement of an upper leg tube in relation to the lower leg tube.

The following discussion will begin with a description of the structure of the components of the present technology. This discussion will then be followed by a description of the components in operation.

Structure

Figure 9A:
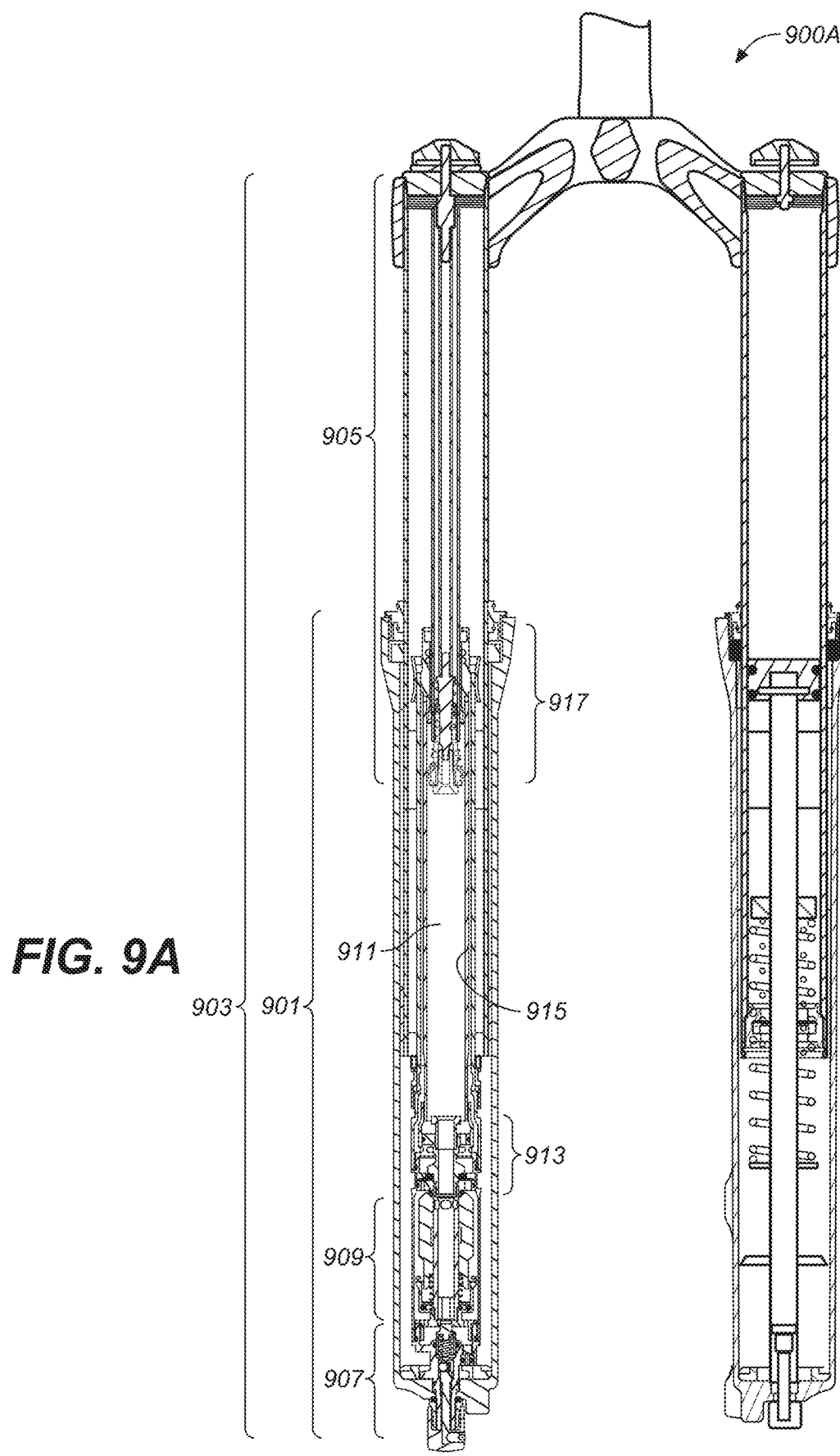
FIG. 9A is a cross-sectional view of a fork, in accordance with embodiments of the present technology.

FIG. 9A shows a cross-sectional view of a fork 900A, in accordance with embodiments of the present technology. FIG. 9A shows the right leg 903, including the upper leg tube 905 telescopically engaged with the lower leg tube 901. In embodiments, movable within the lower leg tube 901 is the damping piston assembly or "damping cartridge" 917. The lower leg tube 901, in embodiments, includes the cylinder 915 enclosing the fluid reservoir 911 and positioned above the damping valve assembly or "lower cartridge" 913. Further, the inertia valve assembly 909 and the blow-off valve assembly 907 are positioned below the lower cartridge 913.

Figure 9B:
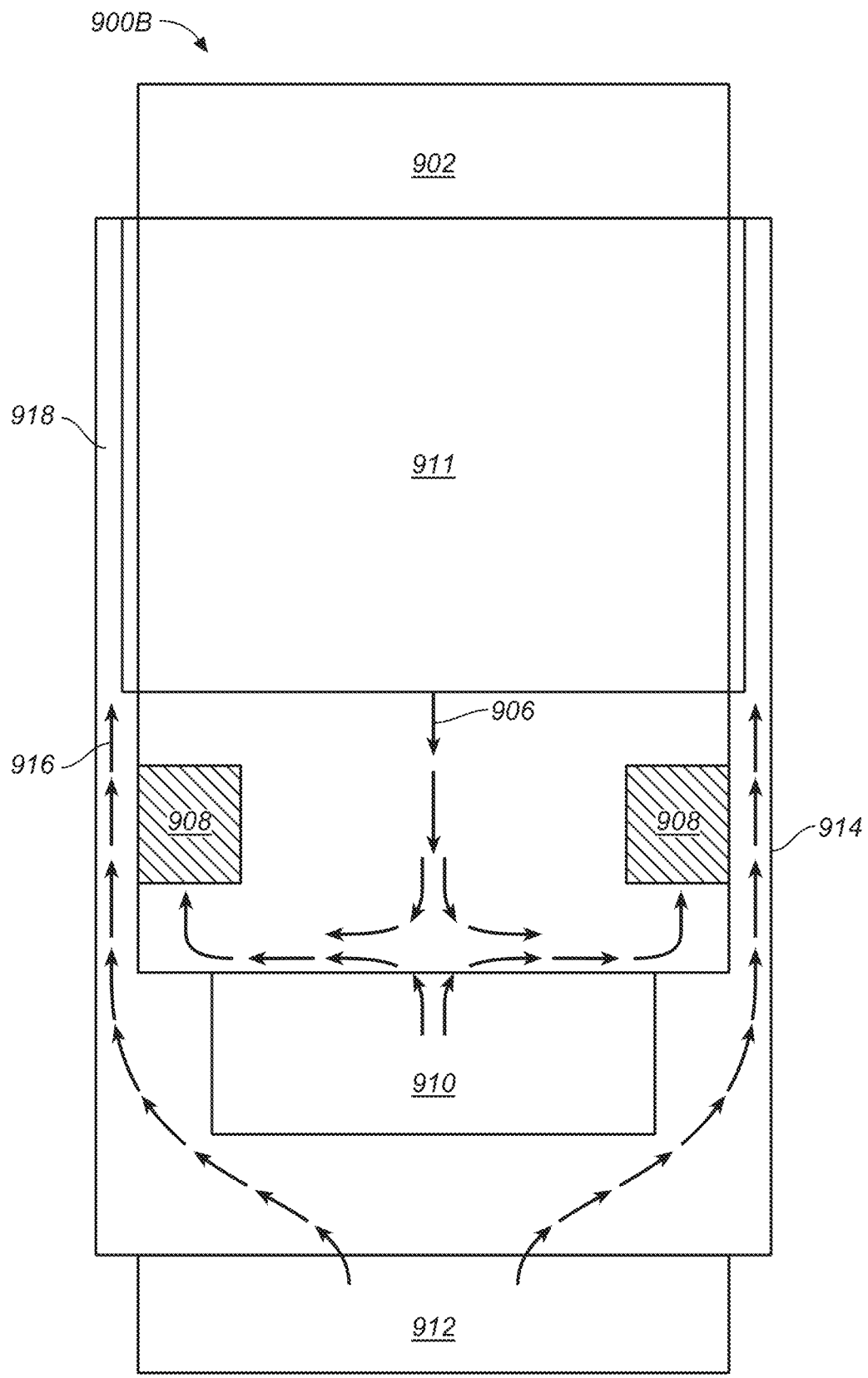
FIG. 9B is a block diagram of a self-regulating suspension, in accordance with embodiments of the present technology.

FIG. 9B is a block diagram of a self-regulating suspension 900B in accordance with embodiments of the present technology. In one embodiment, a self-regulating suspension includes a first suspension member (e.g., upper leg tube 905), a second suspension member (e.g., lower leg tube 901), a fluid reservoir (e.g., compression chamber) 911 and a fluid flow circuit 922. In one embodiment, the first suspension member 902 is axially movable relative to the second suspension member 914.

Figure 9C:
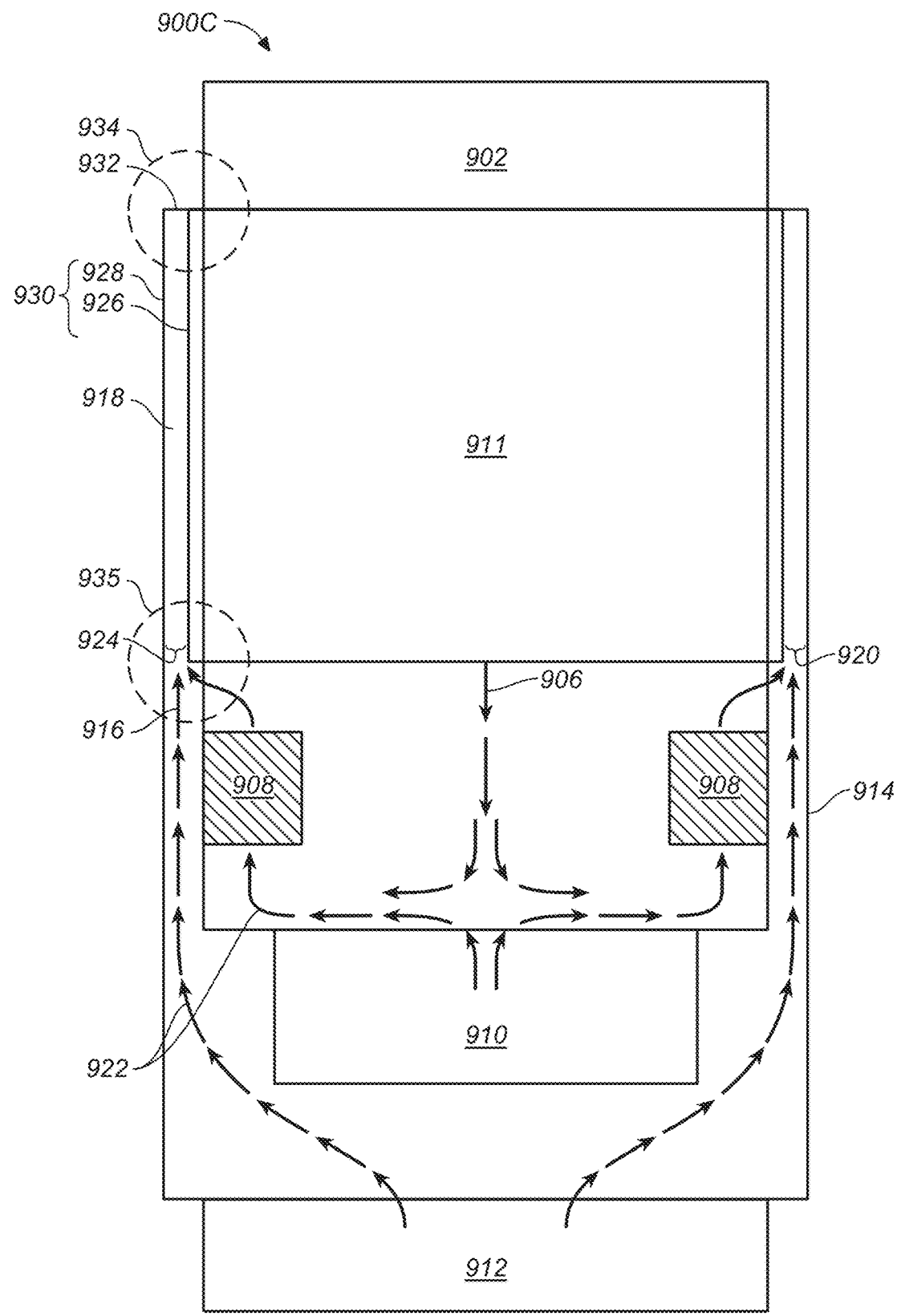
FIG. 9C is a block diagram of a self-regulating suspension, in accordance with embodiments of the present technology.

In another embodiment, the fluid reservoir (e.g., compression chamber) 911 has a volume that is variable in response to a relative movement between the first and the second suspension members. In one embodiment, the fluid flow circuit 922 has a first end 906 in fluidic communication with the fluid reservoir 911 and a second end 916 in fluidic communication with an isolated suspension location (e.g., defined by the interior of the annular elastic bladder [e.g., flexible tubing 928 of FIG. 9C] and the exterior of the compression chamber tube [e.g., cylinder 915 of FIG. 9A]) 918. In one embodiment, the fluid flow circuit 922 comprises a first valve (e.g., inertia valve) 910, a second valve (e.g., damping valve [flow regulator]) 908 and a third valve 912, wherein the first valve 910 and third valve 912 are in parallel and the second valve 908 is in series with each of the first and third valves 910 and 912, respectively.

Of note, in one embodiment, the first valve 910 is part of the inertia valve assembly 909, as shown in FIG. 9A. In one embodiment, the second valve 908 is a flow regulator 956 (shown in FIG. 9D). In one embodiment, a portion of the flow regulator 956 includes a one way shim stack valve. Moreover, in another embodiment, the third valve 912 is part of the blow off valve assembly 907, as shown in FIG. 9A.

In one embodiment, the isolated suspension location 918 includes an inlet 924 in fluidic communication with the second end (e.g., the outlet of the second valve [damping valve]) 916 of the fluid flow circuit 922, an end barrier 932 and an annular enclosing wall 930 that defines an isolated suspension location 918 between the inlet 924 and the end barrier 932. In one embodiment, the annular enclosing wall 930 includes an outer surface 926 of a cylinder 915, a flexible tubing 928, a first compression region 934 and a second compression region 935, the compression regions 934 and 935 including hardware fro sealing and retaining each respective end of the flexible tubing 928.

In one embodiment, the first compression region 934 is configured for sealingly compressing a first end of the flexible tubing 928 against a first end of the of the cylinder 915. In another embodiment, the second compression region 935 includes the inlet 924 and is configured for retainably compressing a second end of the flexible tubing 928 against a second end of the outer surface 926 of the cylinder 915.

Figure 9D:
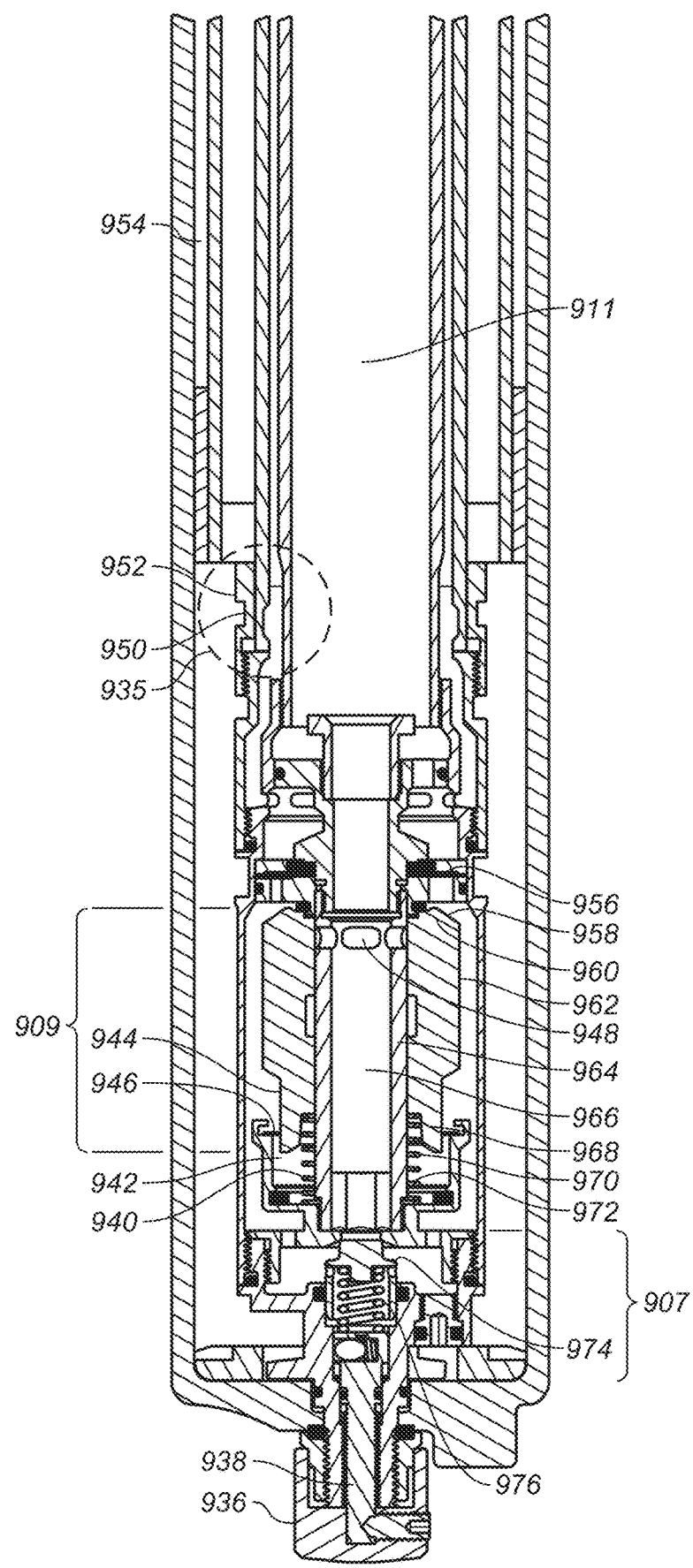
FIG. 9D is a cross-sectional view of a portion of the right leg 903, including a cylinder, a lower cartridge and a inertia valve, in accordance with embodiments of the present technology.

FIG. 9D is a cross-sectional view of a portion of the right leg 903, in accordance with embodiments of the present technology. More specifically, FIG. 9D shows embodiments of the previously schematically described FIGS. 9B and 9C, including a portion of the cylinder, the lower cartridge, the inertia valve and the blow-off valve, according to embodiments.

In one embodiment, the first compression region 934 includes a portion 982 of the first end of the flexible tubing 928, and a first seal ring 980 configured for sealingly compressing the portion 982 of the first end of the flexible tubing 928 against the first end of the outer surface of the cylinder 926, such that the first end of the flexible tubing 928 and the first end of the outer surface 926 of the cylinder 915 are sealingly squeezed shut. Further, in one embodiment, the portion 982 of the first end of the flexible tubing 928 includes an upset. In one embodiment, both ends of the flexible tubing 928 are constant wall with the flexible tubing 928 (i.e., no upsets).

In one embodiment, the second compression region 935 includes a portion 952 of the second end of the flexible tubing 928 and a second seal ring 950 configured for retainably compressing the portion 952 of the second end of the flexible tubing 928 against the second end of the outer surface 926 of the cylinder 926, such that the second end of the flexible tubing 928 and the second end of the outer surface of the cylinder 926 are squeezed partially together to retain a first 915 while remaining open to damping fluid flowing between the fluid flow circuit 922 and the isolated suspension location 918. In one embodiment, the portion 952 of the flexible tubing 928 includes an upset.

Figure 9E:
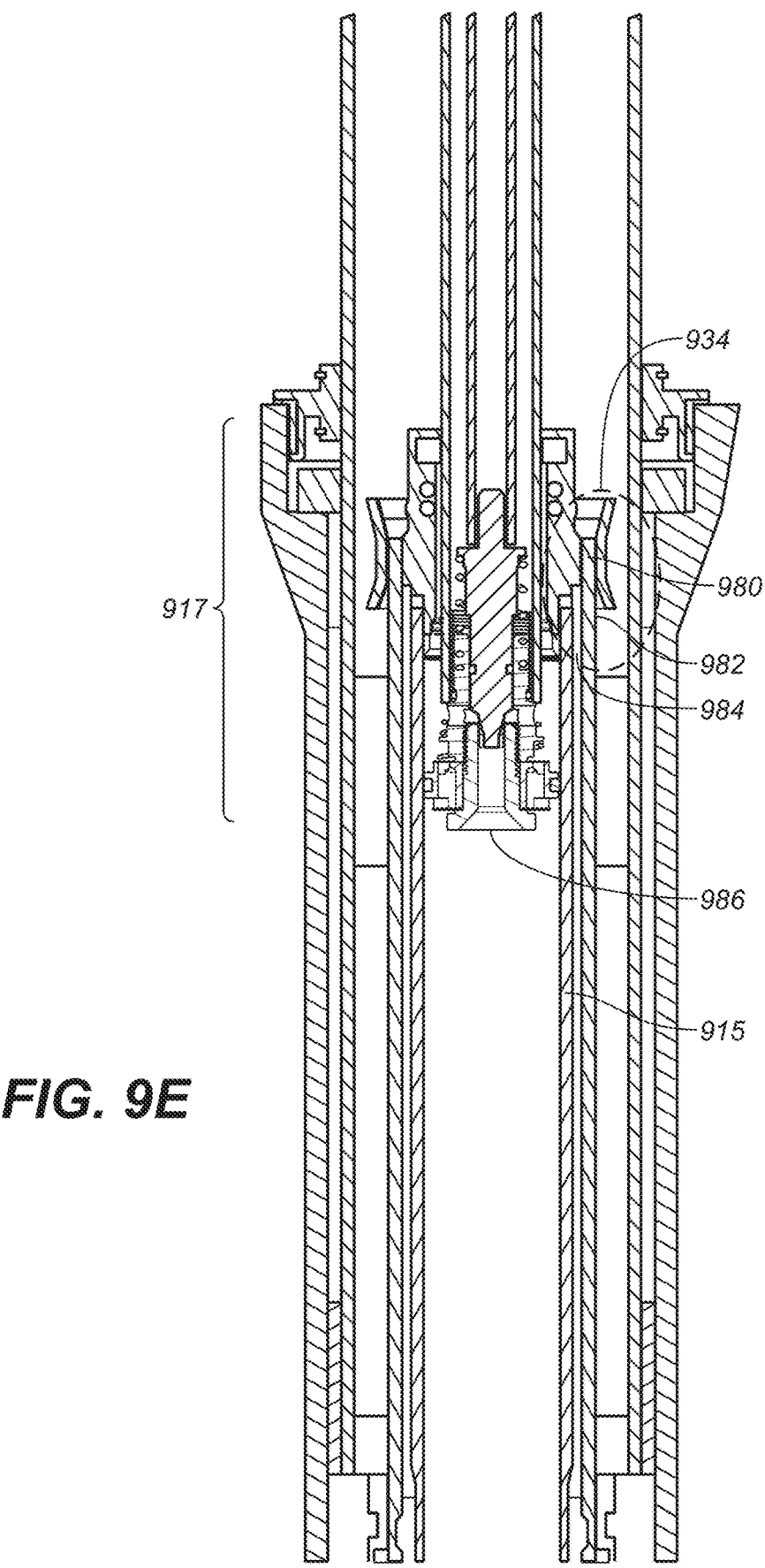
FIG. 9E is a cross-sectional view of a portion of the right leg 903, including a cylinder and a damping cartridge, in accordance with embodiments of the present technology.

FIG. 9E is a cross-sectional view of a portion of the right leg 903, in accordance with embodiments of the present technology. FIG. 9E shows a portion of the cylinder 915 and damping cartridge 917. In one embodiment, the flexible tubing 928 is configured for creating a fluid tight seal at each end of the flexible tubing 928. The outer flexible tube is upset and the upset end is captured by a seal ring (first and second seal rings 980 and 950, respectively). During installation, the seal ring is pressed into the inner diameter at an end of the outer flexible tubing 928 such that it straddles the upset. The end of the outer flexible tubing 928, with the seal ring installed is then slid axially into an inner diameter of a solid cylindrical housing, such as for example, the inner diameter of the annular partition 1602 (of FIG. 16). The annular partition 1602 and the seal ring are dimensioned such that the annular space formed between them is radially thinner than the thickness of the upset, thereby placing the elastic upset in a sealing squeeze (such as an o-ring mechanism would function).

In one embodiment, the bladder stock may be extruded from a suitable elastic material and then cut to an appropriate length. The length may then be upset by a secondary upsetting process (e.g. using heat and pressure). Optionally, the upsetting is not necessary and the seal ring and inner diameter of the annular partition 1602 are designed to squeeze, in sealing engagement, the mere thickness of the bladder stock where such squeeze is also sufficient to resist axially loading and "shrinkage" forces that may occur when the bladder is internally pressurized (to expand radially).

In one embodiment, the flexible tubing 928 includes extruded tube stock. In another embodiment, the flexible tubing 928 includes pulltruded tube stock. In one embodiment, the flexible tubing 928 may be designed, manufactured, and constructed as described herein and may include any suitable material. The outer flexible tubing 928 exhibits elastic characteristics. In the embodiments of FIGS. 9A-9E, the substantially tubular outer flexible tubing is sealingly captured at each end by a support structure 1002 and a pinch cap 1004. Each mechanism is described further herein. Some embodiments may include other features for further definition as disclosed in U.S. patent application Ser. No. 12/509,258, which application is incorporated herein, in its entirety by reference.

In one embodiment, the extruded or pulltruded tube stock is cut in segments to suitable length. Such manufacturing option may reduce costs per bladder and increase the bladder material and property options available.

In one embodiment, one of the first and second suspension members, 902 and 914, respectively, is an upper leg tube 905, and the other of the one of the first and second suspension members, 902 and 914, respectively, is a lower leg tube 901. The lower leg tube 901 is configured for telescopically receiving the upper leg tube 905 and is axially slidable relative thereto.

In one embodiment, the first valve 910 is an inertia valve including a movable inertia mass 962 and a shaft 964. In one embodiment, the shaft 964 comprises an interior hollow portion and an outer surface. The interior hollow portion is in fluidic communication with at least one flow passage intermediate a first and second end of the shaft 964. The at least one flow passage is selectively and at least partially obstructed by the movable inertia mass 962 to control a degree of fluid flow restriction from the fluid reservoir 911 to the isolated suspension location 918 depending on a position of the inertia mass.

For example, and referring now to embodiments of FIGS. 1-9E, when a bump is encountered by a wheel carried by the suspension and damper of FIG. 7, the suspension generally is moved upwardly (as indicated in FIG. 7). The inertia (i.e. tendency to remain at rest) of the inertia valve (of the inertia valve assembly 909) causes that inertia valve, due to its designed mass, to remain in space while a suspension member 902/914 generally moves in response to the impulse caused by the wheel impacting the bump. The result is that the inertia valve "moves" down relative to the shaft 964 (in fact the shaft 964 moves up), thereby fluid communicates through fluidic ports 948 with the axial flow paths 1202. With the inertia valve so open in response to the wheel encountering the bump therefore, fluid may flow from the fluid reservoir 911 and extension (hereinafter, "compression chamber 966"), through the fluidic ports 948, through axial flow paths 1202, and may exert fluid reservoir 911 and compression chamber pressure on the one way shim stack valve 956.

FIG. 10 shows a cross-sectional view of the damping cartridge 917, the cylinder 915 and the lower cartridge 913, in accordance with embodiments of the present technology. Referring now to FIG. 10, it is noted that the one way valve 1002 may include any suitable damping fluid control mechanism described herein or any suitable combination thereof. After the damping fluid has passed through the one way valve 1002, it flows through the path and annulus 1006 and into the isolated suspension location 918 (which may be viewed as a sort of annulus). The isolated suspension location 918 is formed as a volume between flexible tubing 298 (or "bladder") and an inner tube, or compression chamber wall 926 (or outer surface 926 of cylinder 915). The inner tube includes the tubular wall of the fluid reservoir 911. Of note, the fluid reservoir 911 is within a cylinder 915. In one embodiment, the isolated suspension location 918 and the fluid reservoir 911 wall are substantially concentric. The isolated suspension location 918 acts to accumulate displaced fluid reservoir 911 and compression chamber 966 fluids during compression of the suspension, and to supply refill fluid, to the fluid reservoir 911 and the compression chamber 966 during rebound.

FIG. 11 shows a cross-sectional view of the damping cartridge 917, the cylinder 915 and the lower cartridge 913, in accordance with embodiments of the present technology. The return or "rebound" flow sequence includes fluid flowing from the isolated suspension location 918, to the path and annulus 1006, where it then exerts a pressure against one way valve 1002. The one way shim stack valve 956 is biased closed by a spring 1104. When return flow pressure is sufficient, the one way valve 1002 is opened and the damping fluid flows through passage(s) 1008 and into the fluid reservoir 911 and the compression chamber 966. In such an embodiment, the inertia valve is bypassed during rebound. Of note, in one embodiment, the one way valve 1002 includes any of the mechanisms described herein in references to the one way shim stack valve 956 or combination thereof.

In one embodiment, the movable inertia mass 962 is configured for moving along the outer surface of the shaft 964 between a first position 970 and a second position 972. The first position 970 includes a location along the outer surface of the shaft 964 that at least partially restricts fluid flow through a flow passage. In one embodiment, a portion of the fluid bypasses flowing through a flow passage to flow from the fluid reservoir 911 to the isolated suspension location 918 as a piston rod 986 moves further into a second suspension member 914. The second position 972 includes a location along the outer surface of the shaft 964 that is providing less restriction to fluid flow through a flow passage, wherein less fluid bypasses flowing through a flow passage to flow from fluid reservoir 911 to the isolated suspension location 918 as the piston rod 986 moves further into a suspension member.

In one embodiment, the movable inertia mass 962 moves from the first position 970 towards the second position 972 when an upward acceleration imparted to at least a portion of the self-regulating suspension exceeds a predetermined acceleration threshold.

In one embodiment, the inertia valve includes a first plurality of protrusions 958 located on a first end 960 of the movable inertia mass 962. The first plurality of protrusions 958 is configured for impacting a first absorber when the inertia valve is opened. In another embodiment, the inertia valve further includes a second plurality of protrusions 942 located on a second end 944 of the movable inertia mass 962. The second plurality of protrusions 942 is configured for impacting a second absorber 1204 when the inertia valve is closed.

Figure 12:
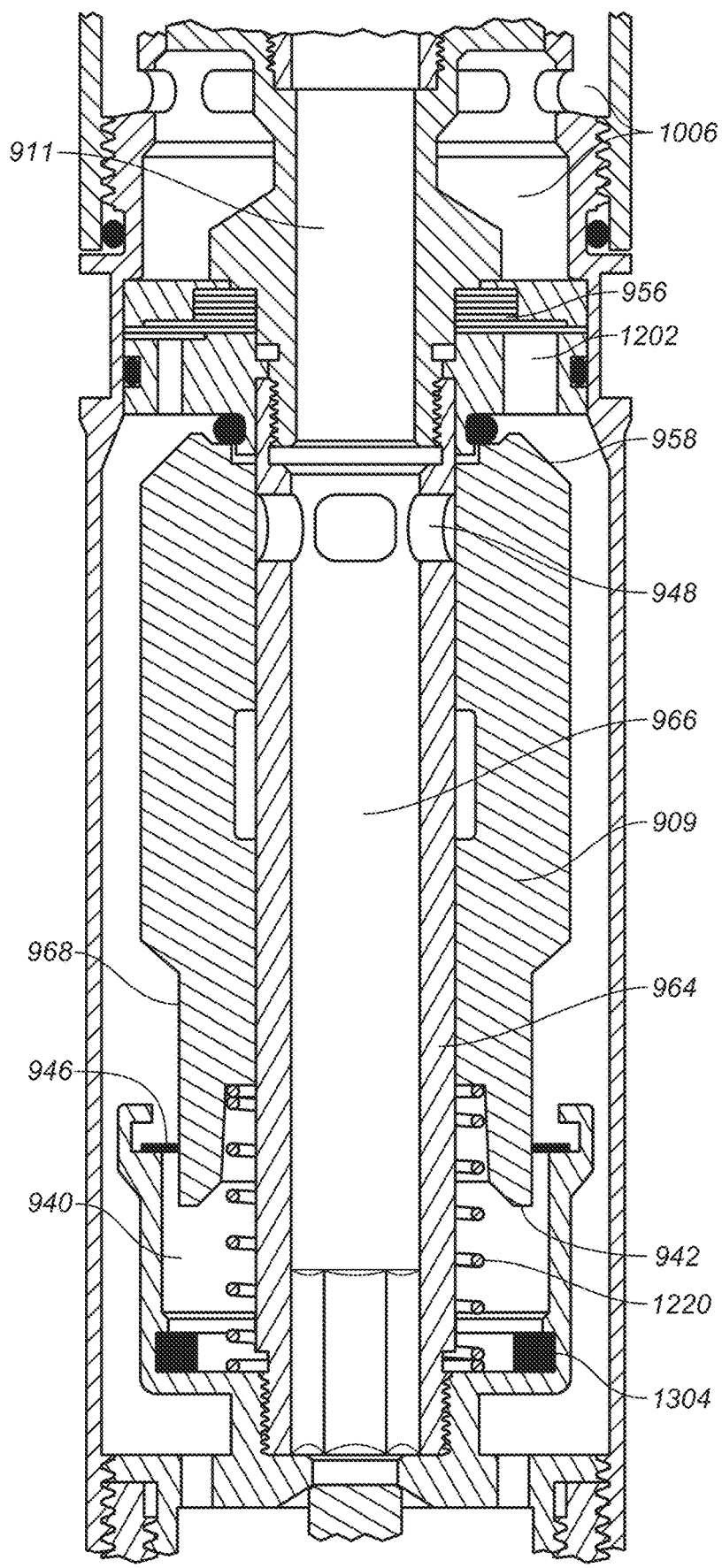
FIG. 12 is a cross-sectional view of a portion of a lower cartridge, an inertia valve and a portion of a blow-off valve, in accordance with embodiments of the present technology.

FIG. 12 shows a cross-sectional view of portion of a lower cartridge 913, an inertia valve and a portion of a blow-off valve, in accordance with embodiments of the present technology. In one embodiment, inertia valve comprises extension "feet" (that are not continuous circumferentially, thereby allowing free fluid flow there around) for impacting an elastomer or other suitably compliant absorber when the inertia valve is opened forcefully. In one embodiment, the extension feet include a first plurality of protrusions 958, as is described herein. In another embodiment, the extension feet include a second plurality of protrusions 942, as is described herein.

In one embodiment, the self-regulating suspension includes an adjustable time delay mechanism configured for delaying the inertia valve from returning to a closed position. In one embodiment, the adjustable time delay mechanism includes a fluid recess 940, a one-way delay valve washer 946 and an inertia valve delay neck 968. In one embodiment, the fluid recess 940 is configured for holding damping fluid. In one embodiment, the fluid recess 940 is in fluidic communication with the fluid flow circuit 922. For example and referring to FIG. 12, the time delay functions to hold the inertia valve open against spring 1220 for a predetermined period of time.

Various inertia valve and delay mechanisms are disclosed in U.S. Pat. Nos. 7,520,372, 7,506,884, 7,273,137, 7,128,102, 6,604,751, and 6,581,948, each of which is incorporated, in its entirety, herein by reference. Various inertia valve and delay mechanisms are disclosed in U.S. Published Patent Application No. 2008/007017 A1, 2008/0053767 A1, and 2008/0053768 A1, each of which is incorporated, in its entirety, herein by reference. Another variety of inertia valve fork is disclosed in U.S. Pat. No. 6,105,987 which is incorporated, in its entirety, herein by reference.

In another embodiment, the one way delay valve washer 946 is configured for opening when a fluid pressure differential between the compression chamber 966 and the fluid recess 940 is below a predetermined threshold. In one embodiment, the inertia valve delay neck 968 is positioned at the second end 944 of the movable inertia mass 962. The inertia valve delay neck 968 is configured for being biased open by a spring 1220 for a predetermined period of time. The period of time is that which is chosen by a user or that which is preset by someone other than the user. In one embodiment, the predetermined period of time is translated to the adjustable time delay mechanism via rotation of a delay adjustment knob. For example, a delay mechanism knob may be turned, which turn changes the time in which the spring 1220 is being biased open.

In one embodiment, the self-regulating suspension further includes a knob assembly that is selectively rotatable. The knob assembly includes, in one embodiment, a damping valve adjustment knob 936 and a damping valve adjustment shaft 938. The damping valve adjustment knob 936 is configured for being rotated. The damping valve adjustment shaft 938 is configured for responding to rotational movement of the damping adjustment knob. In one embodiment, the responding includes moving axially in proportion to a thread helix and pushing or pulling on an adjustment shaft that is coupled with a needle valve 1304, thereby adjusting an interference of the needle valve 1304 within a damping orifice 976 that extends through a center of a damping piston 974. In one embodiment, during compression or extension of the self-regulating suspension, the damping piston 974 controls a flow of the damping fluid.

Figure 13:
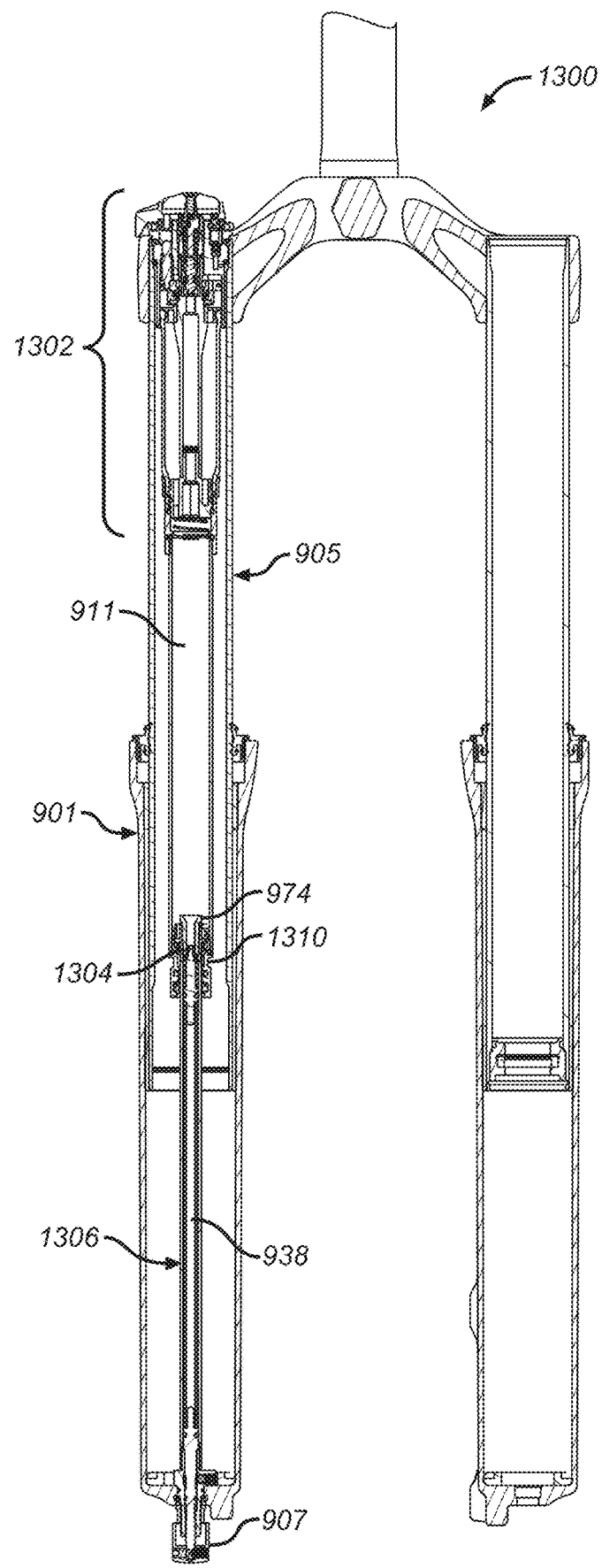
FIG. 13 is a cross-sectional view of a leg of a fork, in accordance with embodiments of the present technology.

FIG. 13 shows a cross-sectional view of a leg of a fork 1300, in accordance with embodiments of the present technology. For example, in one embodiment, as shown in FIG. 13, the boost valve pair is mounted in a control assembly 1302 of a fork 1300. The control assembly 1302 is shown in greater detail in FIGS. 14 and 15. Referring to FIG. 13, the fork 1300 includes an upper leg tube 905 telescopically received within a lower leg tube 901 and axially slidable relative thereto. The lower leg tube 901 includes a piston rod 986 having a damping valve adjustment shaft 938 disposed coaxially therein and axially and rotationally movable relative thereto. The damping valve adjustment shaft 938 moves axially in response to rotation of the blow off valve adjustment knob and thereby adjusts the interference of needle valve 1304 within a damping orifice 976 that extends through the center of the damping piston 974. The damping valve adjustment knob 936 is accessible from an exterior of the fork and in one embodiment is suited for manipulation by hand, thereby allowing manual adjustment of the needle valve 1304. The damping valve adjustment knob 936 is threaded through the lower end of the lower leg tube 901. When the damping valve adjustment knob 936 is selectively rotated by a user, damping valve adjustment shaft 938 moves axially in proportion to the thread helix and the shaft pushes or pulls on the damping valve adjustment shaft 938. The damping piston 974 (e.g. orifices there through) controls the flow of fluid from the compression side of the damping fluid chamber to the rebound side 1310 of the damping fluid chamber during a compression of the fork and vice versa during an extension of the fork, thereby providing a selectable damping resistance.

Optionally, a spring (not shown) is included between the damping valve adjustment shaft 938 and the needle valve 1304 so that during compression of the fork, a threshold pressure in the compression chamber 966 can overcome the preset or selected spring force (based on adjustment of the damping valve adjustment knob 936), thereby allowing the fork to "blow off" or allow damping fluid to flow through (rebound side 1310) an otherwise substantially closed piston orifice. The damping piston 974 may also include a boost valve piston such as that shown and described herein, for example, in FIG. 12.

In one embodiment, the third valve 912 is a blow-off valve of the blow-off valve assembly 907. The blow-off valve is configured for allowing the first and second suspension members to move closer together in response to a pressure imparted on the blow-off valve during a compression of a suspension member within the other suspension member. In one embodiment, the pressure is equal to or greater than a threshold pressure when a lock-out valve of the inertia valve is in a substantially inhibiting movement position.

Figure 14:
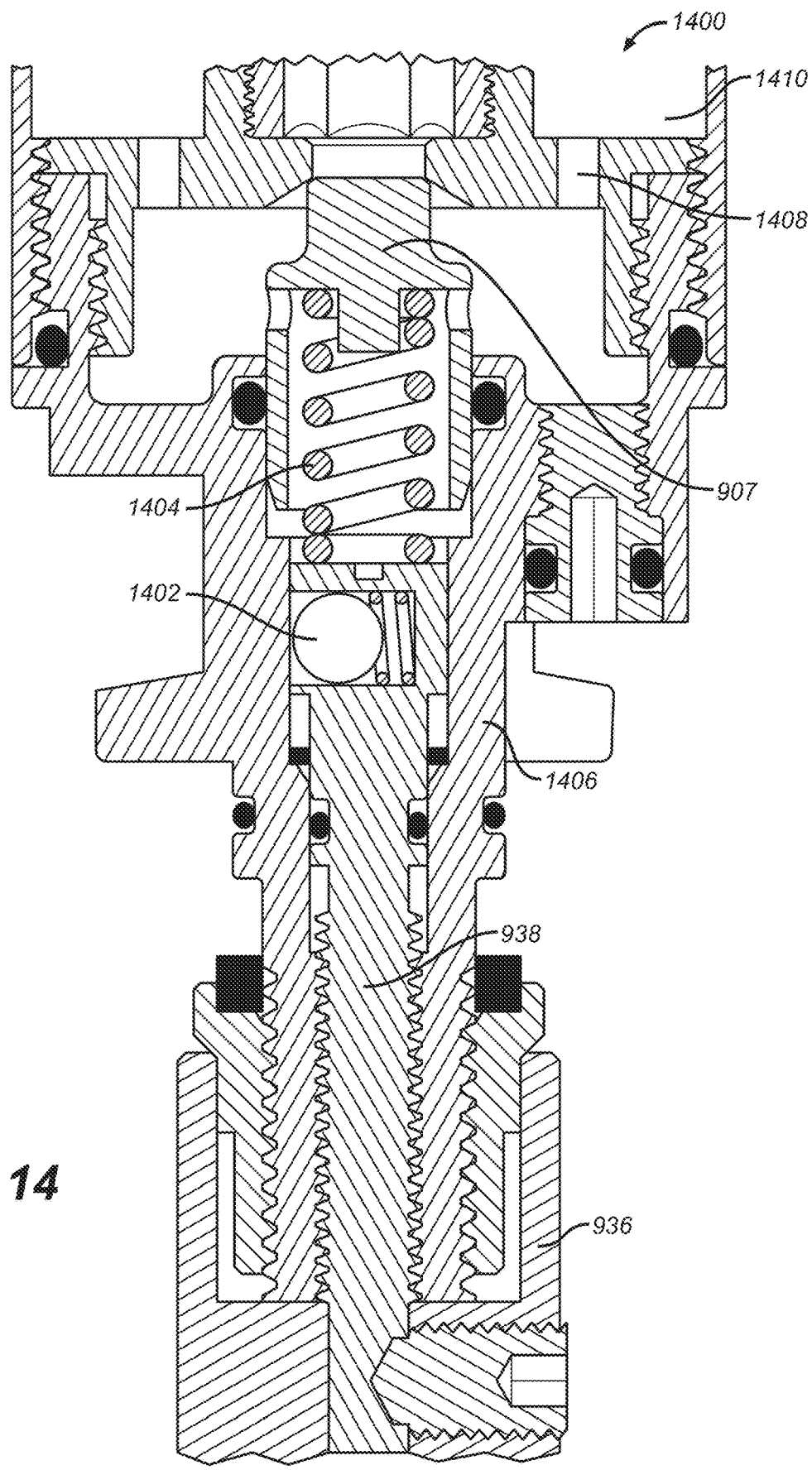
FIG. 14 is a cross-sectional view of a blow-off valve, in accordance with embodiments of the present technology.

FIG. 14 is a cross-sectional view of a blow-off valve, in accordance with embodiments of the present technology. As shown in FIG. 14, the blow off threshold is user adjustable by means of a damping valve adjustment knob 936. The damping valve adjustment knob 936 is rotationally fixed to the damping valve adjustment shaft 938 which is held incremental rotational positions relative to the lower cartridge 704 (of FIG. 7) by spring loaded ball detent mechanism 1402. Rotation of the damping valve adjustment shaft 938 causes the damping valve adjustment shaft 938 to translate axially relative to cartridge extension and correspondingly relative to spring 1404. Rotation of the damping valve adjustment knob 936 therefore, decreases or increases the preload compression in spring 1404 and therefore the seating force of the blow-off valve. When fluid pressure in the fluid reservoir 911 and compression chamber 966, multiplied times the effective seated area of the blow-off valve, exceeds the seating force of the blow-off valve, compression fluid will flow past the blow-off valve, through flow path 1408, and into recess 1410, around an exterior of the inertia valve and into the isolated suspension location 918 as previously described (e.g. via the one way shim stack valve 956). In one embodiment, the "blow-off" valve (second valve 912) of the blow-off valve assembly 907 is replaced with, or located in parallel with (or actually co-functional in that a bleed valve includes an overpressure pop off or blow off feature), an adjustable bleed valve or other suitable inertia valve bypass valve. It is noteworthy that, in one embodiment, all compression flow passes through the same one way shim stack valve 956 regardless of whether it is by normal function or blow off. If a bump is encountered and the inertia valve does not open in a timely manner, then the blow-off valve will serve to allow the suspension damper to compress by allowing compression fluid flow to bypass the inertia valve. Lock and blow-off valve features are disclosed in U.S. Pat. No. 7,163,222, which patent is incorporated, in its entirety, herein by reference.

For example, and with reference to FIGS. 7-9E, in one embodiment, the damper assembly 700 of FIG. 7 is resistant to compression force (e.g. "locked out") until a bump is encountered, by a wheel connected to the damper assembly, that is sufficient to move the inertia valve (shown in FIG. 12) downward relative to the damper shaft. The inertia valve is biased closed over the fluidic ports 948 by the spring 335. When the fluidic ports 948 are closed, damping fluid is "locked" within fluid reservoir 911 and compression chamber 966 and cannot evacuate, thereby preventing the piston rod 986 from further entering the fluid reservoir. Since damping fluid cannot evacuate from the fluid reservoir 911 and the compression chamber 966 to compensate for the incursion of the volume of rod into the fluid reservoir 911, the damper (and associated suspension) is "locked out".

In one embodiment, the threshold pressure is operator-selectable. In another embodiment, the threshold pressure is adjustable from a location external to the first and second suspension members.

Referring now to FIG. 9D, in one embodiment, the second valve 908 includes a flow regulator 956 (such as, for example, one or more orifices optionally covered by flexible plates or "shims"). In one embodiment, the flow regulator 956 includes a one-way shim stack valve configured for controlling a damping rate by providing resistance to damping fluid flowing there through. In one embodiment, the resistance that is provided by the one-way shim stack valve against the damping fluid is adjustable. In one embodiment, the damping rate is controlled during a flow of the damping fluid towards the isolated suspension location 918. In another embodiment, the damping rate is controlled during a rebound flow of the damping fluid away from the isolated suspension location 918.

In one embodiment, for example, the one way shim stack valve 956 may be set to a predetermined resistance to control damping rate. In one embodiment, the resistance of the one way shim stack valve 956 is adjustable so that compression damping may be varied. In one embodiment (not shown), the one way shim stack valve 956 includes a one way stack allowing flow upward toward the fluid reservoir 911 and a separate one way flow path stack allowing one way flow downward from the fluid reservoir 911 to control rebound damping.

Figure 15:
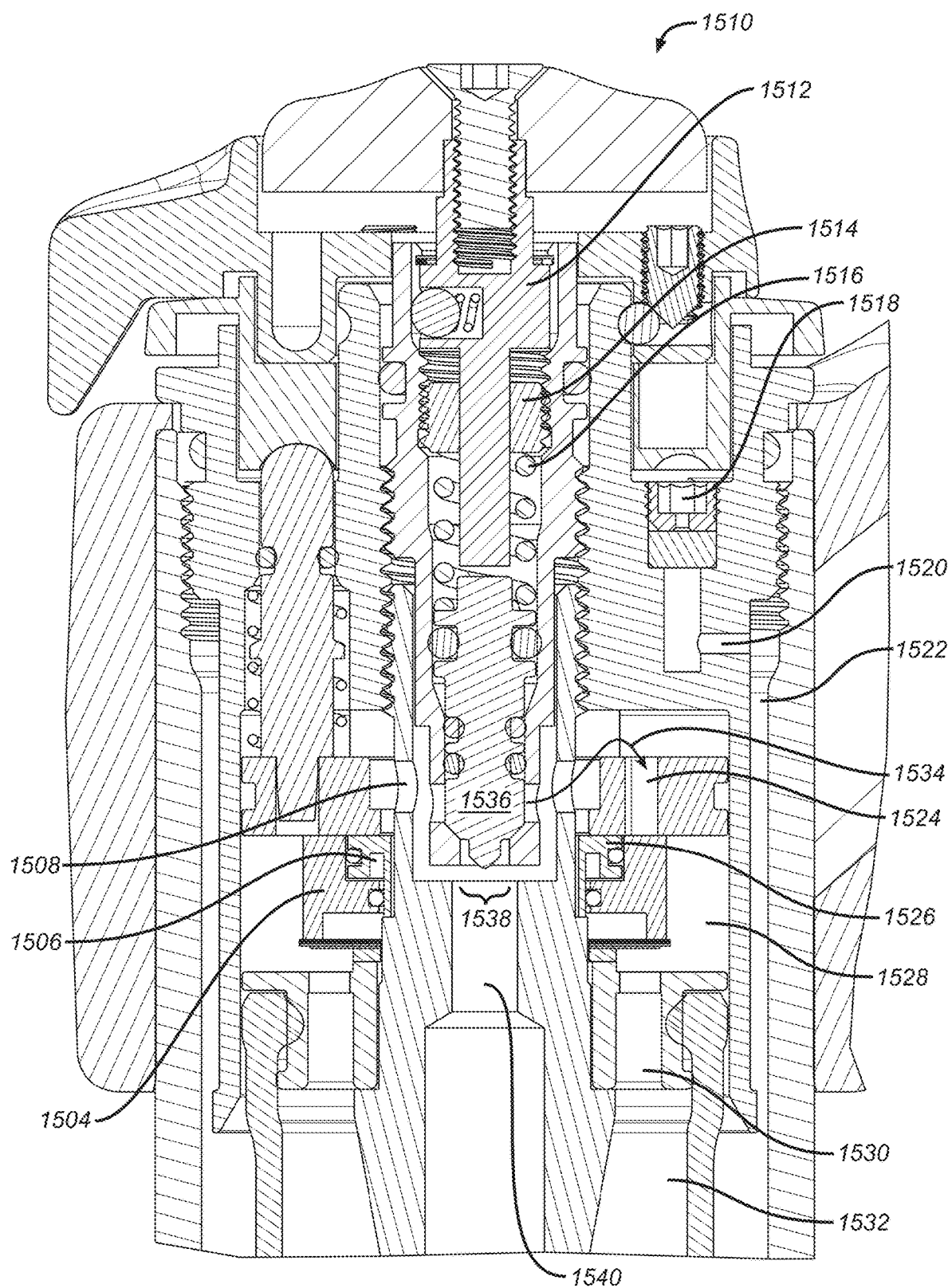
FIG. 15 is a cross-sectional view of an inertia valve, including a boost valve pair, in accordance with embodiments of the present technology.

FIG. 15 shows an inertia valve including a boost valve pair, in accordance with embodiments of the present technology. Referring now to FIGS. 9A-9E and 15, in one embodiment, the one way shim stack 956 includes a valve inner 1526 and a valve outer 1504. Thus, while the inertia valve is open, the damper becomes more resistant to compression as the piston rod 986 progresses deeper into the fluid reservoir 911 and the compression chamber 966. In such a "boost valve" embodiment, a volume 954 exterior the isolated suspension location 918 and the outer flexible tubing 928 may be pressurized with gas above atmospheric pressure to enhance the function of the boost valve pair, the valve inner 1526 and the valve outer 1504. Alternatively, a low pressure option as described herein may be used.

In one embodiment, the third valve 912 is a boost valve configured for providing increasing resistance to compression as a piston rod 986 progresses deeper into the fluid reservoir 911.

In one embodiment, a volume 954 exterior to the isolated suspension location 918 is pressurized with gas above atmospheric pressure for increasing an ability of the boost valve to resist the compression.

In one embodiment of the present technology, a damping suspension includes a first tube, a second tube telescopically receiving at least a portion of the first tube, a cylinder 915, a flexible tubing 928 coupled with the cylinder 915 and an isolated suspension location 918. In one embodiment, the cylinder 915 has an inner and outer surface 926, wherein the inner surface at least partially bounds a fluid reservoir 911. In another embodiment, the flexible tubing 928 is coupled with the first end 984 of the cylinder 915, wherein a first end of the flexible tubing 928 is sealingly compressed with a first end 984 of the cylinder 915. In one embodiment, a ring seal, as is described herein, presses the first end of the flexible tubing 928 against the outer surface 926 of the cylinder 915, such that the flexible tubing 928 becomes immobile and a seal is formed. In one embodiment, the second end of the flexible tubing 928 is retainably compressed towards a second end of the outer surface 926 of the cylinder 915. The second end of the outer surface 926 of the cylinder 915 may include the cylinder 915 itself, or parts extending from the cylinder 915. For example, in one embodiment a ring seal presses the second end of the flexible tubing 928 towards the outer surface 926 of the cylinder 926 such that the second end becomes immobile, while damping fluid is able to flow between the flexible tubing 928 and the outer surface 926 of the cylinder 926.

In one embodiment, the isolated suspension location 918 includes a fluid flow circuit 922, a first valve 910 and a second valve 908. In one embodiment, the isolated suspension location 918 is defined by the outer surface 926 of the cylinder 915 and an inner surface of the flexible tubing 928. In one embodiment, the isolated suspension location 918 has a fluid pressure cavity port (inlet 924) that is in fluidic communication with a damping suspension valve assembly. The flexible tubing 928 is configured for expanding as damping fluid enters the isolated suspension location 918 and is configured for compressing as the damping fluid leaves the isolated suspension location 918.

In one embodiment, the damping suspension valve assembly includes a fluid flow circuit 922 comprising a first end 906 in fluidic communication with the fluid reservoir 911 and a second end 916 in fluidic communication with the isolated suspension location 918.

In one embodiment of the present technology, a damping suspension valve assembly includes a fluid flow circuit 922, a first valve 910, a second valve 908 and a third valve 912. In one embodiment, the fluid flow circuit 922 includes a first end 906 in fluidic communication with the fluid reservoir 911 and a second end 916 in fluidic communication with the isolated suspension location 918. The fluid reservoir 911 receives therein a variable volume, and the isolated suspension location 918 receives a damping fluid from the fluid flow circuit 922 in response to the variable volume.

In one embodiment, the first valve 910 is positioned along the fluid flow circuit 922. The first valve 910 includes a compression chamber 966 there within and is configured for opening and closing in response to a variable pressure imparted on the first valve 910 by the damping fluid. In one embodiment, the compression chamber 966 is in fluidic communication with both the isolated suspension location 918 and the fluid reservoir 911 when the first valve 910 is open, and the compression chamber 966 is in fluidic communication with the fluid reservoir 911 when the first valve 910 is closed. In one embodiment, the first valve 910 is an inertia valve.

In one embodiment, of the damping suspension valve assembly, the second valve 908 includes an upper surface coupled with the isolated suspension location 918 and a lower surface coupled with the first valve 910 via the fluid flow circuit 922. The second valve 908 is configured for providing resistance to the damping fluid flowing along the fluid flow circuit 922. In one embodiment, the second valve 908 is a flow regulator 956 (including, in one embodiment, a one-way shim stack valve), wherein a first portion of the fluid flow circuit 922 moving there through is in series with a second portion of the fluid flow circuit 922 moving through the first valve 910.

In one embodiment, the third valve 912 is in fluidic communication with the first and second valve. The third valve 912 is configured for pushing the damping fluid towards the isolated suspension location 918 in response to a pressure imparted on the second valve 908 during compression of the damping suspension that is equal to or greater than an operator-selectable threshold pressure when the first valve 910 is in a substantially inhibiting movement position. In one embodiment, the third valve 912 is a blow-off valve.

In one embodiment, the outer flexible tube 928 acts as the floating piston assembly 202. In one embodiment, the outer flexible tube 928 may be pressurized form a source outside of the fork. Additionally, in one embodiment of the vehicle suspension damper in a leg of a fork, a variable damper is coupled with the piston assembly 202. In another embodiment, the variable damper is coupled with a ported bulkhead.

Referring again to FIG. 4, in which a two legged fork (of a vehicle, e.g., bicycle) with a suspension damper is shown in accordance with embodiments of the present technology. As described herein, the cartridge of FIG. 3 may be installed in one leg of the fork. In one embodiment and as described herein, one leg may include the vehicle suspension damper 400 of FIG. 4 and the other leg of the fork may include a spring (e.g., gas spring, mechanical spring, coil) which stores energy during compression of the fork and then releases that energy when a disparity is passed. In one embodiment, the spring is adjustable.

In one embodiment, the legs include boost valves. In another embodiment, forks include pressurized boost valves. For example, areas within the legs of the fork of FIG. 4 are capable of holding matter and may be "pressurized" from an outside source with air, gas, and/or liquid.

In one embodiment, the suspension damper includes a compression chamber, a first flow path and a second flow path. In one embodiment, the compression chamber includes a piston and rod movable therein. In one embodiment, the first flow path extends from a first compression chamber portion to a second compression chamber portion, wherein the first compression chamber portion and the second compression chamber portion is separated by the piston. In one embodiment, the second flow path extends from the compression chamber to an isolated suspension location. The second flow path traverses at least one of a terrain sensitive valve and a bypass valve. The second flow path further traverses a flow regulator, wherein at least one of the flow regulator and the terrain sensitive valve and the bypass valve is axially overlapping at least a portion of the isolated suspension location.

Figure 16:
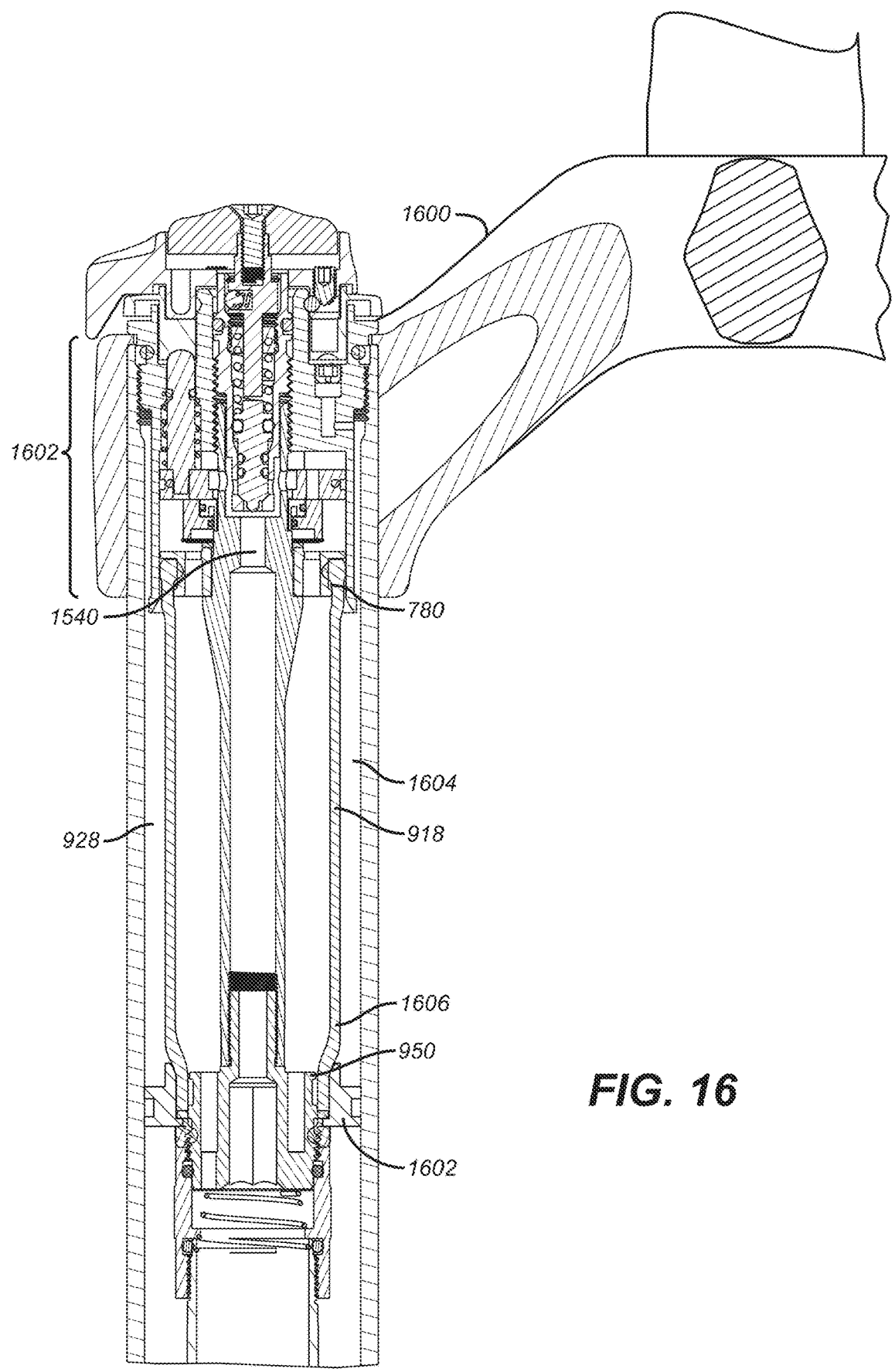
FIG. 16 is a cross-sectional view of a vehicle suspension damper of a fork, in accordance with embodiments of the present technology.

Referring now to FIG. 16, a cross-sectional view of a vehicle suspension damper 1600 and related components with a leg of a two legged fork is shown in accordance with embodiments of the present technology. The outer flexible tube 928 within the lower damper can be clearly seen.

Operation

Figure 17:
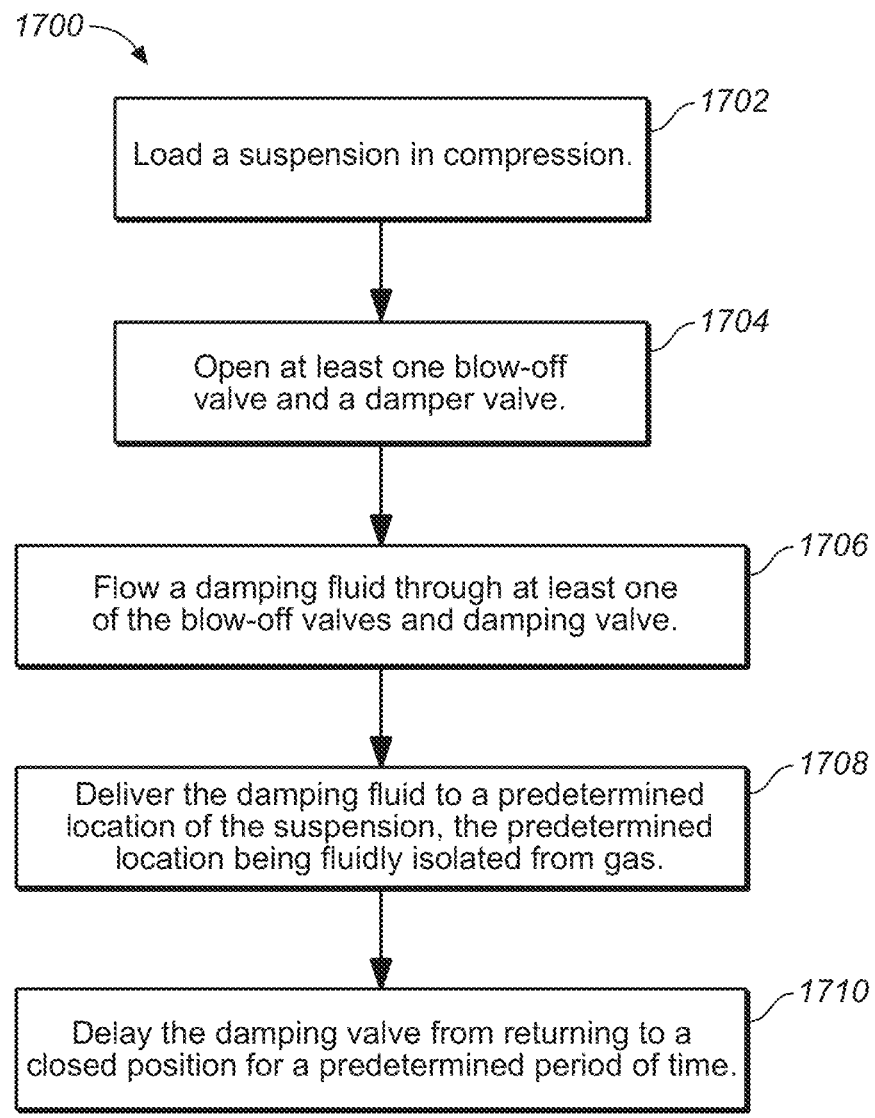
FIG. 17 is a flow of a method for unlocking a suspension, in accordance with embodiments of the present technology.

FIG. 17 is a flow chart of a method for unlocking a suspension is shown, in accordance with embodiments of the present technology. Referring now to FIGS. 9A-9E and 17, a suspension may be described as being loaded in compression. At 1704, at least one of a blow-off valve and a terrain sensitive damper valve is opened. In one embodiment, at least one of the blow-off valve and a damping valve is opened when a predetermined threshold damping fluid pressure is exceeded. In one embodiment, this predetermined threshold damping fluid pressure imparted upon the at least one of a blow-off valve and a terrain sensitive damper valve is adjusted by a pressure threshold adjustment knob.

At 1706, a damping fluid flows through the at least one of the blow-off valve and the terrain sensitive damping valve. At 1708, the damping fluid is delivered, via the flow regulator 956, to a predetermined location of the suspension, the predetermined location being fluidly isolated from gas. At 1710, the terrain sensitive damping valve is delayed from returning to a closed position for a predetermined period of time. In one embodiment, this predetermined period of time is set via a delay adjustment knob.

In one embodiment, during compression of the fork, the piston shaft 1306 progresses into the fluid reservoir 911 and rebound side 1310. As it does so, it must, because the fluid reservoir 911 and rebound side 1310 is of fixed volume, displace a volume of fluid (typically "incompressible" damping liquid such as hydraulic oil) corresponding to the volume of the piston shaft 1306 as it enters the fluid reservoir 911. The displacement of the damping fluid from the fluid reservoir 911 and rebound side 1310 affords an additional damping feature.

Referring again to FIGS. 15 and 16, the displaced fluid flows from the fluid reservoir 911 and into the compression chamber 966. From there, it continues into the throat, and then to the orifice 1538. When the damping fluid pressure at the orifice 1538 is sufficient to overcome the preload spring 1516, the damping fluid flows through the orifice 1538 and along flow paths (through a plurality of apertures 1508 disposed circumferentially about the throat body 1540) into a plurality of orifices 1520. The plurality of orifices 1520 are obstructed at a lower end by a valve outer. The valve outer 1504 is "nested" with the valve inner 1526 and an annular fluid chamber 1506 is formed between the valve outer 1504 and the valve inner 1526. In one embodiment, the annular fluid chamber 1506 is filled by gas at atmospheric pressure. When the static or "ambient" pressure of the damping fluid is greater than atmospheric, it acts to force the valve outer 1504 upwardly and the valve inner 1526 downwardly. In other words, the valve outer 1504 and the valve inner 1526 tend to become more tightly "nested". That in turn forces the valve outer 1504 against the plurality of orifices 1520. The greater the differential pressure between the damping fluid and the annular fluid chamber 1506, the greater the force will be that is exerted by the valve outer 1504 against the plurality of orifices 1520. That in turn will increase resistance to damping fluid flow through the plurality of orifices 1520 toward the flow path 1534 and will thereby increase the compressive damping force of the fork. Damping fluid flowing through the flow paths 1534 then flows into the annular fluid chamber 1506 where its pressure may be affected by gas pressure in chamber.

Referring now to FIGS. 13-16, in one embodiment, the annular fluid chamber 1506 is filled with substantially nothing and therefore contains a vacuum. That may be accomplished by engaging or "nesting" the parts, valve inner and valve outer, in a vacuum, or by pumping the annular fluid chamber 1506 down (e.g. vacuum pump) through an orifice 1538 (not shown) and then plugging the orifice 1538. When the annular fluid chamber 1506 is at vacuum, mere atmospheric pressure will be higher. In one embodiment, pressurization of the shock absorber or fork leg (e.g. through gas induction valve 1518 to chamber) may be atmospheric or slightly above atmospheric. In one low pressure embodiment, the annular bladder or floating piston is used in order to isolate a minimized volume of gas for facilitating pressure increases during a compression stroke of the suspension. In one embodiment, the annular fluid chamber 1506 serves to isolate the gas compensation chamber from the damping fluid, thereby avoiding any intermingling of the gas and the fluid (e.g. liquid oil) which would result in a reduced damping performance (due to the damping fluid becoming emulsified).

In one embodiment, the annular fluid chamber 1506 is filled with gas at above atmospheric pressure, whereby such gas pressure is specified to be greater than an initial (corresponding to an extended state of the suspension) static damping fluid pressure and corresponding gas pressure within the chamber. In such an embodiment, the gas in the annular fluid chamber 1506 biases the outer and inner valve portions away from one another (e.g. increasing the gap) until the suspension is stroked sufficiently in compression to revise the static damping fluid pressure to a value higher than that annular fluid chamber 1506 gas pressure. In one embodiment, the boost valve damping mechanism is held open until a predetermined point in the compression stroke is reached. In such an embodiment, the suspension exhibits very compliant damping characteristics until later in the compression stroke, at which point the suspension becomes more rigid (and in that way suspension "bottom out" may be mitigated). In one embodiment, a mechanical spring is placed within the annular fluid chamber 1506 such that it is in compression between the outer and inner valve halves and biases them to move apart in a manner, and with a result, similar to the foregoing description except that the spring rate may be more linear than an initial gas pressure charge "spring").

In one embodiment, the volume of the annular fluid chamber 1506 is configured in proportion to the diameter of the piston shaft 1306 and the length of the suspension stroke or the length of the piston shaft 1306 that will, at most, enter into the fluid reservoir 911 and the rebound side 1310. Such a consideration may be referred to as the "damper compression ratio". In one embodiment, the volume of the annular fluid chamber 1506 is twice the volume of the piston shaft 1306 that may enter the fluid reservoir 911 and rebound side 1310 at maximum compression stroke of the suspension or in other words the damper compression ratio is two (volume of the compensating chamber divided by the shaft volume maximum minus shaft volume [in the damping chamber] initial). In some boost valve suspension embodiments, useful compression ratios range from 1.5 to 4. In some embodiment, more particular useful compression ratios range from 2 to 3. In some fork embodiments, compression ratios may be relatively lower in a range because a fork typically operates within a vehicle system on a one to one basis (i.e. the wheel moves an inch and the fork moves an inch, whereas a shock may move ½ inch per 2 inches of wheel travel, thereby increasing the inch per inch resistance required of an effective shock. There is no levering linkage usually associated with a fork. There is often linkage associated with a rear shock.)

The ambient pressure of the damping fluid may be altered by pressurizing (in one embodiment with a compressible fluid such as a gas) the compensation chamber. In one embodiment, the isolated suspension location 918 is pressurized by adding gas, at a desired damping fluid ambient pressure, through gas induction valve 1518. The gas induction valve 1518 may be a rubber plug under a set screw, a Schrader type gas valve, a Presta type gas valve or any valve suitable for gas introduction and sealing at pressure. When the gas is introduced into the gas induction valve 1518, it flows through the plurality of orifices 1520 and into the isolated suspension location 918. In one embodiment, the isolated suspension location 918 is sealed at a lower end by an annular partition 1602 and seal in order to limit the volume of pressurized gas, consistent with a desired damping compression ratio, influencing the dimension of the upper tube (and if the upper tube is completely pressurized dimensional changes and possible binding between fork legs may occur). In one embodiment, the isolated suspension location 918 may be pressurized to 100 or 200 psi and may function at pressures from 200 to 600 psi.

Referring now to FIGS. 10 and 15, the ambient pressure of the damping fluid may be altered by pressurizing (in one embodiment with a compressible fluid such as a gas) the fluid reservoir. In one embodiment, the fluid reservoir 911 is pressurized by adding gas, at a desired damping fluid ambient pressure, through the gas induction valve 1518. The gas induction valve 1518 may be a rubber plug under a set screw, a Schrader type gas valve, a Presta type gas valve or any valve suitable for gas induction and sealing at pressure. When the gas is introduced into the gas induction valve 1518, it flows through the orifices 1520 and into the isolated suspension location 918. In one embodiment, the fluid reservoir 911 is sealed at a lower end by an annular partition 1602 and is sealed in order to limit the volume of pressurized gas influencing the dimension of the upper tube (see FIG. 13) (if the upper tube is completely pressurized dimensional changes and possible binding between fork legs may occur).

Figure 18:
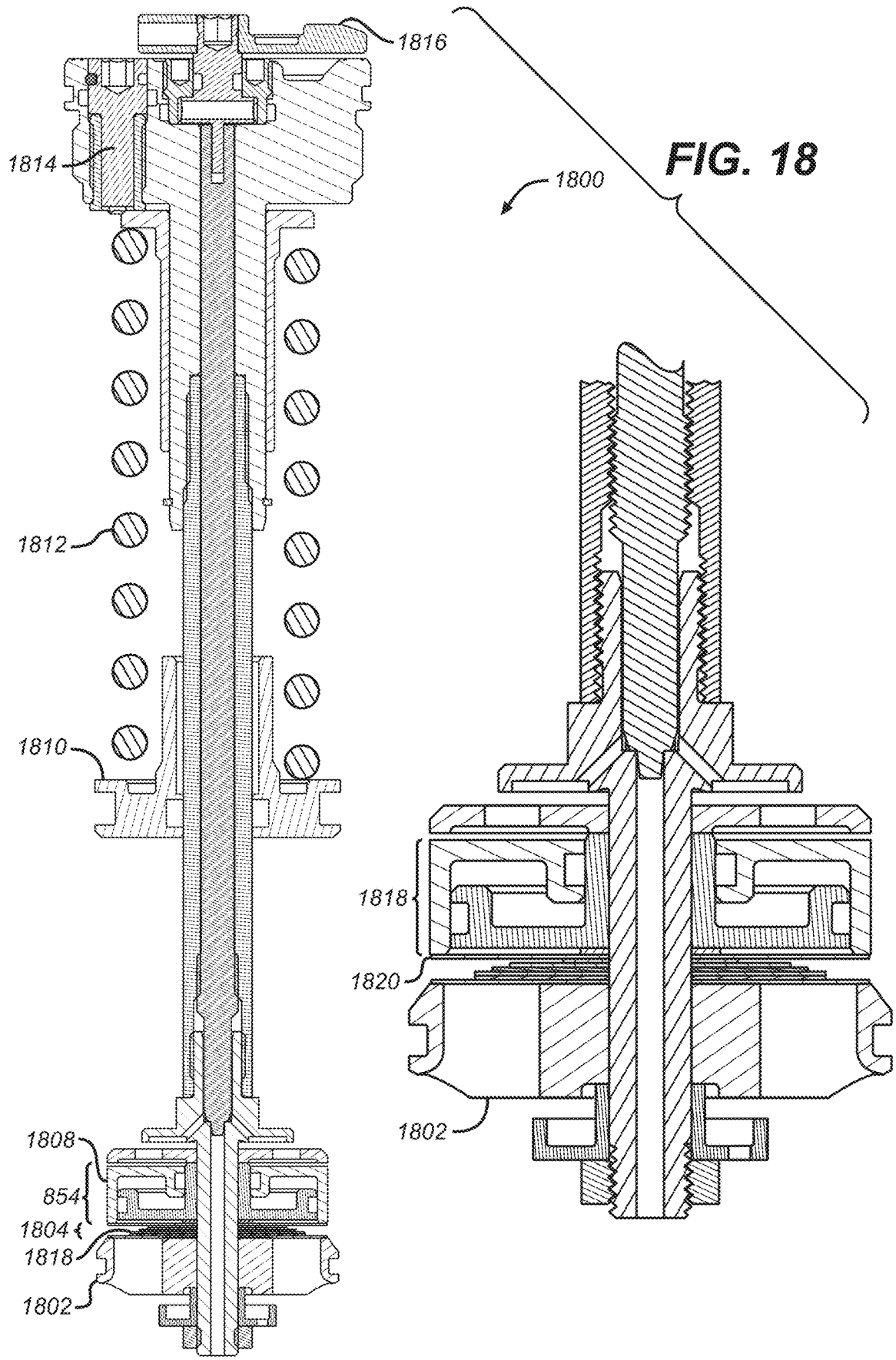
FIG. 18 is a cross-sectional view of a vehicle suspension damper of a fork, in accordance with embodiments of the present technology.

Referring now to FIG. 18, a cross sectional view of a vehicle suspension damper and related components within a fork 1800 that is configured for a motorcycle is shown in accordance with embodiments of the present technology. Shown in the fork 1800 are the following components: piston assembly 1802, variable damper 1818, movable outer valve 1808, reverse bend shim 1806, main stack of shims 1804, the first big diameter shim 1820 furthest from the piston assembly 1802, IFP chamber 1810 (similar in function to the damping fluid chamber of previous figures), compression bleed adjuster (not labeled), spring pre-load adjuster (not labeled) and IFP spring 1812.

In operation, the variable damper 1818 acts against a reverse bend shim 1806 arrangement. As the pressure in the IFP chamber 1812 increases due to compression of the fork 1800, the movable outer valve 1808 pushes against the first big diameter shim 1820 furthest from the piston assembly 1802. The first big diameter shim 1820 bends against the main stack of shims 1804, effectively increasing the stiffness of the main stack of shims 1804 as the fork 1800 is compressed.

At the beginning of travel, when the pressure of the IFP chamber 1812 is at a minimum, the variable damper 1818 is not influencing the damping force. At some point into the travel, when the reverse bend shim 1806 assembly starts to engage the main stack of shims 1804, is when the variable damper 1818 starts acting. This gives initial free movement of the fork 1800 and then produces the position-sensitive effect to the compression damping deeper in travel.

Of note, external adjustments may be made to the components of the fork 1800. For example, a compression bleed adjuster is coupled in parallel with the variable damper 1818. The compression bleed adjuster is configurable to be adjusted externally. In addition, in one embodiment, there is a spring pre-load adjuster which acts to change the pre-load on the IFP spring 1812. In one embodiment, turning the spring pre-load adjuster clockwise will increase the pre-load on the IFP spring 1812 and make the variable damper 1818 react closer to the initial part of its travel. Turning the spring pre-load adjuster will control the dive or pitch of the fork 1800 (most notable in the corners).

Another external adjustment that may be made in accordance with embodiments of the present technology is to alter the height of the external oil bath. Raising the oil height will increase the damping of the air volume in the fork 1800, thus increasing the apparent pressure of the IFP chamber 1810. Most likely, this adjustment will affect the last few inches of travel.

Referring now to FIG. 15, in one embodiment, the fork includes an adjustable damping mechanism including a metering valve 1536. The metering valve 1536 can be adjusted by rotation of the top cap 1510, which correspondingly rotates the adjuster 1512. The adjuster 1512 is non round and engages a similarly non round hole through a nut 1514. When the adjuster 1512 is rotated, the nut 1514 is rotated and also traverses its threaded housing axially. As the nut 1514 moves axially, the preload on the preload spring 1516 is correspondingly altered. Because the preloaded spring exerts an axial load on the metering valve 1536 body, the damping characteristic, or resistance to flow through the orifice is selectively and manually adjusted by turning the top cap 1510.

The pressurized gas acts almost without resistance on the damping fluid through the outer flexible tube 928. In one embodiment, the outer flexible tube 928 is made from an elastomer (or other suitable flexible material) and acts as a pressure transmitting diaphragm (annular) between the gas in the isolated suspension location 918 and the damping fluid in the isolated suspension location 918. Because the damping fluid in the annulus is in pressure communication with the entire damping fluid system including the fluid reservoir 911 and rebound side 1310, the communication of gas pressure in the fluid reservoir 911 to the fluid pressure in the isolated suspension location 918 (through the outer flexible tube 928) increases the ambient damping fluid pressure tot hat of the gas pressure of the isolated suspension location 918. As described herein, the ambient pressure influences the damping force exerted by the boost valve or valves included within the fork (valve outer and valve inner). As the fork compresses during a compression stroke, the volume of damping fluid displaced by the piston rod (of FIG. 7) acts to further increase the ambient damping fluid pressure in the system by compressing the gas in the isolated suspension location 918 by an amount corresponding to the piston rod 986 introduced into the compression chamber 966 and rebound side 1310.

Referring now to FIGS. 10 and 15, during compression of the fork, the piston shaft 1306 progresses into the fluid reservoir 911 and the compression chamber 966. As it does so, it must, because the fluid reservoir 911 and the compression chamber 966 is of a fixed volume, displace a volume of fluid (typically "incompressible" damping liquid such as hydraulic oil corresponding to the volume of the shaft as it enters the chamber). The displacement of damping fluid from the fluid reservoir 911 and rebound side 1310 affords an additional damping feature.

The displaced fluid flows from the fluid reservoir 911 into compression chamber 966. From there, it continues into the throat body 1540 to the orifice. When the damping fluid pressure at the orifice 1538 is sufficient to overcome the meter valve preload spring 1516, the damping fluid flows through the orifice 1538 and along the flow paths 1528 (through a plurality of apertures 1508 disposed circumferentially about the throat body 1540) into a plurality of orifices 1520.

The plurality of orifices 1520 are obstructed by the valve outer. The valve outer is nested with the valve inner and an annular fluid chamber 1506 is formed between the valve outer and the valve inner. In one embodiment, the annular fluid chamber 1506 is filled by gas at atmospheric pressure. When the "ambient" pressure of the damping fluid is greater than atmospheric, it acts to force the outer valve upwardly and the inner valve downwardly. In other words, the outer valve and the inner valve tend to become more tightly "nested". That in turn forces the outer valve against the plurality of orifices 1520. The greater the differential pressure between the damping fluid and the annular fluid chamber 1506, the greater the force will be that is exerted by the valve outer against the plurality of orifices 1520. That in turn will increase resistance to the damping fluid flow through the plurality of orifices 1520 toward the flow path 1534 and will thereby increase the compressive damping force of the fork. Damping fluid flowing through the flow paths 1534 then flows into the annular bladder interior 1532 where its pressure may be affect by gas pressure in the chamber.

While the foregoing is directed to embodiments of the present technology, other and further embodiments of the present technology may be implemented without departing from the scope of the invention, and the scope thereof is determined by the claims that follow.

What we claim is:

1. A suspension system comprising:
   an upper leg tube;
   a lower leg tube, said upper leg tube telescopically engaged with and said lower leg tube;
   a damping cartridge movable within said lower leg tube;
   a cylinder disposed at least partially within said lower leg tube;
   a fluid reservoir enclosed within said cylinder;
   an inertia valve assembly disposed in said lower leg tube below, said inertia valve disposed below said damping cartridge; and
   a blow-off valve assembly disposed in said lower leg tube below, said inertia valve disposed below said damping cartridge, and wherein said inertia valve comprises:
   a movable inertia mass; and
   a shaft comprising an interior hollow portion and an outer surface, said interior hollow portion being in fluidic communication with at least one flow passage intermediate a first and second end of said shaft, said at least one flow passage being selectively at least partially obstructed by said inertia mass to control a degree of fluid flow restriction from said fluid reservoir to said isolated suspension location depending on a position of said inertia mass, wherein said movable inertia mass is configured for moving along said outer surface of said shaft between a first position and a second position, said first position comprising a location along said outer surface of said shaft that at least partially restricts fluid flow through said at least one flow passage, wherein a portion of said fluid bypasses flowing through said at least one flow passage to flow from said fluid reservoir to said isolated suspension location as a piston rod moves further into said one of said upper leg tube and said lower leg tube, and said second position comprising a location along said outer surface of said shaft that is providing less restriction to fluid flow through said at least one flow passage, wherein less fluid bypasses flowing through said at least one flow passage to flow from said fluid reservoir to said isolated suspension location as said piston rod moves further into said one of upper leg tube and said lower leg tube, and wherein said movable inertia mass moves from said first position towards said second position when an upward acceleration imparted to at least a portion of said suspension system exceeds a predetermined acceleration threshold.

2. The suspension system of claim 1 further comprising:
said fluid reservoir having a volume, said volume variable in response to a relative movement between said upper leg tube and said lower leg tube;
a fluid flow circuit disposed in said first fork leg, said fluid flow circuit having a first end in fluidic communication with said fluid reservoir and a second end in fluidic communication with an isolated suspension location;
a damper cap assembly coupled to said upper leg tube; and
a spacer disposed in said upper leg tube.

3. The suspension system of claim 2 wherein said flexible tubing comprises extruded tube stock.

4. The suspension system of claim 2 wherein said flexible tubing comprises pulltruded tube stock.

5. The suspension system of claim 1 further comprising:
a first compression region, said first compression region comprising:
  a portion of said first end of said flexible tubing; and
  a first seal ring configured for said sealingly compressing said portion of said first end of said flexible tubing against a first end of an outer surface of said cylinder, such that said first end of said flexible tubing and said first end of said outer surface of said cylinder are sealingly squeezed shut.

6. The suspension system of claim 5, wherein said portion of said first end of said flexible tubing comprises an upset.

7. The suspension system of claim 1, further comprising:
a second compression region, said second compression region comprising:
  a portion of said second end of said flexible tubing; and
  a seal ring configured for retainably compressing said portion of said second end of said flexible tubing against said second end of said outer surface of said cylinder, such that said second end of said flexible tubing and said second end of said outer surface of said cylinder are squeezed partially together to retain a first position while remaining open to a damping fluid flowing between said fluid flow circuit and said isolated suspension location.

8. The suspension system of claim 7, wherein said portion of said second end of said flexible tubing comprises an upset.

9. The suspension system of claim 1, wherein said inertia valve further comprises:
a first plurality of protrusions located on a first end of said movable inertia mass, said first plurality of protrusions configured for impacting a first absorber when said inertia valve is opened.

10. The suspension system of claim 9, wherein said inertia valve further comprises:
a second plurality of protrusions located on a second end of said movable inertia mass, said second plurality of protrusions configured for impacting a second absorber when said inertia valve is closed.

11. The suspension system of claim 9, further comprising:
an adjustable time delay mechanism configured for delaying said inertia valve from returning to a closed position, said adjustable time delay mechanism comprising:
  a fluid recess configured for holding damping fluid, said fluid recess in fluidic communication with said fluid flow circuit;
  a one way delay valve washer configured for opening when a fluid pressure differential between a compression chamber and said fluid recess is below a predetermined threshold; and
  an inertia valve delay neck positioned at said second end of said movable inertia mass, said inertia valve delay neck configured for being biased open by a spring for a predetermined period of time.

12. The suspension system of claim 11, wherein said predetermined period of time is translated to said adjustable time delay mechanism via rotation of a delay adjustment knob.

13. The suspension system of claim 9, further comprising:
a knob assembly selectively rotatable, said knob assembly comprising:
  a damping valve adjustment knob configured for being rotated; and
  a damping valve adjustment shaft configured for responding to rotational movement of said damping adjustment knob, said responding comprising moving axially in proportion to a thread helix and pushing or pulling on an adjustment shaft that is coupled with a needle valve, thereby adjusting an interference of said needle valve within a damping orifice that extends through a center of a damping piston, wherein, during compression or extension of said suspension system, said damping piston controls flow of said damping fluid.

14. The suspension system of claim 9, wherein said blow-off valve is configured for allowing said upper leg tube and said lower leg tube to move together in response to a pressure imparted on said blow-off valve during a compression of said upper leg tube and said lower leg tube, wherein said pressure is equal to or greater than a threshold pressure when a lock-out valve of said inertia valve is in a substantially inhibiting movement position.

15. The suspension system of claim 14, wherein said threshold pressure is operator-selectable.

16. The suspension system of claim 15, wherein said threshold pressure is adjustable from a location external to said upper leg tube and said lower leg tube.

17. The suspension system of claim 9, wherein said inertia valve comprises:
a flow regulator configured for controlling a damping rate by providing resistance to damping fluid flowing there through, wherein a resistance provided by said flow regulator against a damping fluid is adjustable.

18. The suspension system of claim 17, wherein said damping rate is controlled during a flow of said damping fluid towards said isolated suspension location.

19. The suspension system of claim 17, wherein said damping rate is controlled during a rebound flow of said damping fluid away from said isolated suspension location.

20. The suspension system of claim 9, wherein said blow-off valve is a boost valve configured for providing increasing resistance to compression as a piston rod progresses deeper into said fluid reservoir.

21. The suspension system of claim 20, wherein a volume exterior to said isolated suspension location is pressurized with gas above atmospheric pressure for increasing an ability of said boost valve to resist said compression.

* * * * *